United States Patent
Claessens et al.

(10) Patent No.: US 10,663,684 B2
(45) Date of Patent: May 26, 2020

(54) MODULE AND ENCLOSURE FOR USE THEREIN

(71) Applicant: COMMSCOPE CONNECTIVITY BELGIUM BVBA, Kessel-Lo (BE)

(72) Inventors: Bart Mattie Claessens, Hasselt (BE); Erwin Beckers, Werchter (BE); Jan Oversteyns, Geetbets (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/087,522

(22) PCT Filed: Mar. 22, 2017

(86) PCT No.: PCT/EP2017/056847
§ 371 (c)(1),
(2) Date: Sep. 21, 2018

(87) PCT Pub. No.: WO2017/162751
PCT Pub. Date: Sep. 28, 2017

(65) Prior Publication Data
US 2019/0101716 A1  Apr. 4, 2019

Related U.S. Application Data

(60) Provisional application No. 62/312,557, filed on Mar. 24, 2016, provisional application No. 62/312,224, filed on Mar. 23, 2016.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/443* (2013.01);
(Continued)

(58) Field of Classification Search
CPC .................................................. G02B 6/4452
See application file for complete search history.

(56) References Cited

U.S. PATENT DOCUMENTS

| 6,983,095 | B2 | 1/2006 | Reagan |
| 7,088,899 | B2 | 8/2006 | Reagan |

(Continued)

FOREIGN PATENT DOCUMENTS

| WO | 2005050277 A2 | 6/2005 |
| WO | 2010/001155 A2 | 1/2010 |

(Continued)

OTHER PUBLICATIONS

International Search Report and Written Opinion of the International Searching Authority for International Patent Application No. PCT/EP2017/056847 dated Jun. 13, 2017, 13 pages.

*Primary Examiner* — Sung H Pak
(74) *Attorney, Agent, or Firm* — Merchant & Gould P.C.

(57) ABSTRACT

A fiber optic module includes a housing having a first major surface and an opposite second major surface. The module includes an input configured to receive at least one module input fiber. The module includes at least one connectorized pigtail output routed from the housing. The pigtail output is configured to carry a signal from at the at least one module input fiber entering the housing via the input. The module further includes at least one connector storage feature disposed on the first major surface of the housing. The connector storage feature is configured to receive and store the connectorized pigtail output.

20 Claims, 34 Drawing Sheets

(52) U.S. Cl.
CPC ........... *G02B 6/445* (2013.01); *G02B 6/4455* (2013.01); *G02B 6/4471* (2013.01)

(56) References Cited

U.S. PATENT DOCUMENTS

| | | |
|---|---|---|
| 7,103,255 B2 | 9/2006 | Reagan |
| 7,146,089 B2 | 12/2006 | Reagan |
| 7,171,102 B2 | 1/2007 | Reagan |
| 7,200,317 B2 | 4/2007 | Reagan |
| 7,369,741 B2 | 5/2008 | Reagan |
| 7,397,997 B2 | 7/2008 | Ferris |
| 7,400,815 B2 | 7/2008 | Mertesdorf |
| 7,400,816 B2 | 7/2008 | Reagan |
| 7,471,869 B2 | 12/2008 | Reagan |
| 7,480,437 B2 | 1/2009 | Ferris |
| 7,489,849 B2 | 2/2009 | Reagan |
| 7,539,387 B2 | 5/2009 | Mertesdorf |
| 7,539,388 B2 | 5/2009 | Mertesdorf |
| 7,627,222 B2 | 12/2009 | Reagan |
| 7,646,958 B1 | 1/2010 | Reagan |
| 7,720,343 B2 | 5/2010 | Barth |
| 7,751,675 B2 | 7/2010 | Holmberg |
| 7,805,044 B2 | 9/2010 | Reagan |
| 7,809,232 B2 | 10/2010 | Reagan |
| 7,809,235 B2 | 10/2010 | Reagan |
| 7,816,602 B2 | 10/2010 | Landry |
| 7,844,161 B2 | 11/2010 | Reagan |
| 7,873,255 B2 | 1/2011 | Reagan |
| 7,941,027 B2 | 5/2011 | Mertesdorf |
| 8,005,335 B2 | 8/2011 | Reagan |
| 8,111,966 B2 | 2/2012 | Holmberg |
| 8,121,458 B2 | 2/2012 | Barth |
| 8,213,760 B2 | 7/2012 | Rudenick |
| 8,224,145 B2 | 7/2012 | Reagan |
| 8,263,861 B2 | 9/2012 | Landry |
| 8,285,103 B2 | 10/2012 | Reagan |
| 8,363,999 B2 | 1/2013 | Mertesdorf |
| 8,374,476 B2 | 2/2013 | Reagan |
| 8,569,618 B2 | 10/2013 | Landry |
| 8,718,434 B2 | 5/2014 | Growall |
| 8,837,894 B2 | 9/2014 | Holmberg |
| 9,146,372 B2 | 9/2015 | Reagan |
| 9,146,373 B2 | 9/2015 | Reagan |
| 9,335,505 B2 | 5/2016 | Reagan |
| 9,557,504 B2 | 1/2017 | Holmberg |
| 9,678,292 B2 | 6/2017 | Landry |
| 2005/0175307 A1 | 8/2005 | Battey |
| 2005/0271344 A1 | 12/2005 | Grubish |
| 2007/0147765 A1 | 6/2007 | Gniadek |
| 2010/0284662 A1 | 11/2010 | Reagan |
| 2010/0329625 A1 | 12/2010 | Reagan |
| 2011/0013875 A1 | 1/2011 | Bran De Leon |
| 2011/0026894 A1 | 2/2011 | Rudenick |
| 2011/0097050 A1 | 4/2011 | Blackwell |
| 2012/0251063 A1 | 10/2012 | Reagan |
| 2013/0084050 A1* | 4/2013 | Vastmans ............... H02G 3/081 385/135 |
| 2013/0216187 A1 | 8/2013 | Dowling |
| 2013/2029099 | 8/2013 | Reagan |
| 2015/0093090 A1 | 4/2015 | Aznag |
| 2015/0192741 A1 | 7/2015 | Dowling |
| 2016/0216467 A1 | 7/2016 | Reagan |
| 2017/0023758 A1 | 1/2017 | Reagan |
| 2017/0168256 A1 | 6/2017 | Reagan |
| 2017/0176701 A1* | 6/2017 | Claessens ............ G02B 6/3897 |
| 2018/0157002 A1* | 6/2018 | Bishop ................ G02B 6/4441 |
| 2019/0101716 A1* | 4/2019 | Claessens ............ G02B 6/3897 |

FOREIGN PATENT DOCUMENTS

| | | |
|---|---|---|
| WO | 2011009060 A2 | 1/2011 |
| WO | 2015025060 A1 | 2/2015 |
| WO | 2015/144397 A1 | 10/2015 |
| WO | 2015/150204 A2 | 10/2015 |

* cited by examiner

MODULE AND ENCLOSURE FOR USE THEREIN

CROSS-REFERENCE TO RELATED APPLICATIONS

This application is a National Stage Application of PCT/EP2017/056847, filed on Mar. 22, 2017, which claims the benefit of U.S. Patent Application Ser. No. 62/312,224, filed on Mar. 23, 2016, and claims the benefit of U.S. Patent Application Ser. No. 62/312,557, filed on Mar. 24, 2016, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

As demand for telecommunications increases, optical fiber services are being extended in more and more areas. To more efficiently extend the fiber optic service into areas where current and future customers are located, telecommunications enclosures are integrated throughout the network of telecommunications cables. Such enclosures provide connection locations where one or more optical fibers of the multi-fiber cable may be connected to end users/subscribers. Also, the enclosures are adapted to house and protect telecommunications components such as splices, termination panels, power splitters, and wavelength division multiplexers.

Improvements are desired.

SUMMARY

According to one aspect of the present the disclosure, a fiber optic module is disclosed. The fiber optic module includes a housing having a first major surface and an opposite second major surface. The module includes an input configured to receive at least one module input fiber and at least one connectorized pigtail output routed from the housing. The pigtail output is configured to carry a signal from module input fiber (s) entering the housing via the input. The module further includes at least one connector storage feature disposed on the first major surface of the housing. The connector storage feature is configured to receive and store the connectorized pigtail output.

According to another aspect, the disclosure is directed to an enclosure includes a base defining a splice region and a cover coupled to the base to move between a closed position and an open position. The cover and the base cooperate to define an interior when the cover is in the closed position and the cover provides access to the interior when in the open position. The enclosure also includes a plurality of ruggedized adapters disposed on the cover. Each ruggedized adapter having an inner port accessible from an inner side of the cover and an outer port accessible from an outer side of the cover. The enclosure further includes a module disposed at the inner side of the cover. At least one module input fiber being routed from the splice region of the base to the module. The at least one input fiber is output from the module as a pigtail that has a connectorized end configured to be connected to the inner port of one of the ruggedized adapters. The module also has a first major surface that includes connector storage. The connector storage is configured to receive and hold the connectorized end of the pigtail. The enclosure also includes a cable input location for receiving an input cable that includes at least one tube surrounding at least one feeder fiber that carries the same signal as the at least one module input fiber being routed from the splice region to the module. The input cable being anchored to the base at the cable input location.

According to another aspect, the disclosure is directed to at least one connector storage slots being disposed on a first major surface of a module. The slot includes a first end and a second end. Each slot is configured to receive a connectorized pigtail of the module at the first end and hold the connectorized pigtail within the slot.

In some embodiments, the at least one slot further comprises a pair of retention tabs, a pair of side walls, and at least a partial end wall to aid in retaining the connectorized pigtail within the slot.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
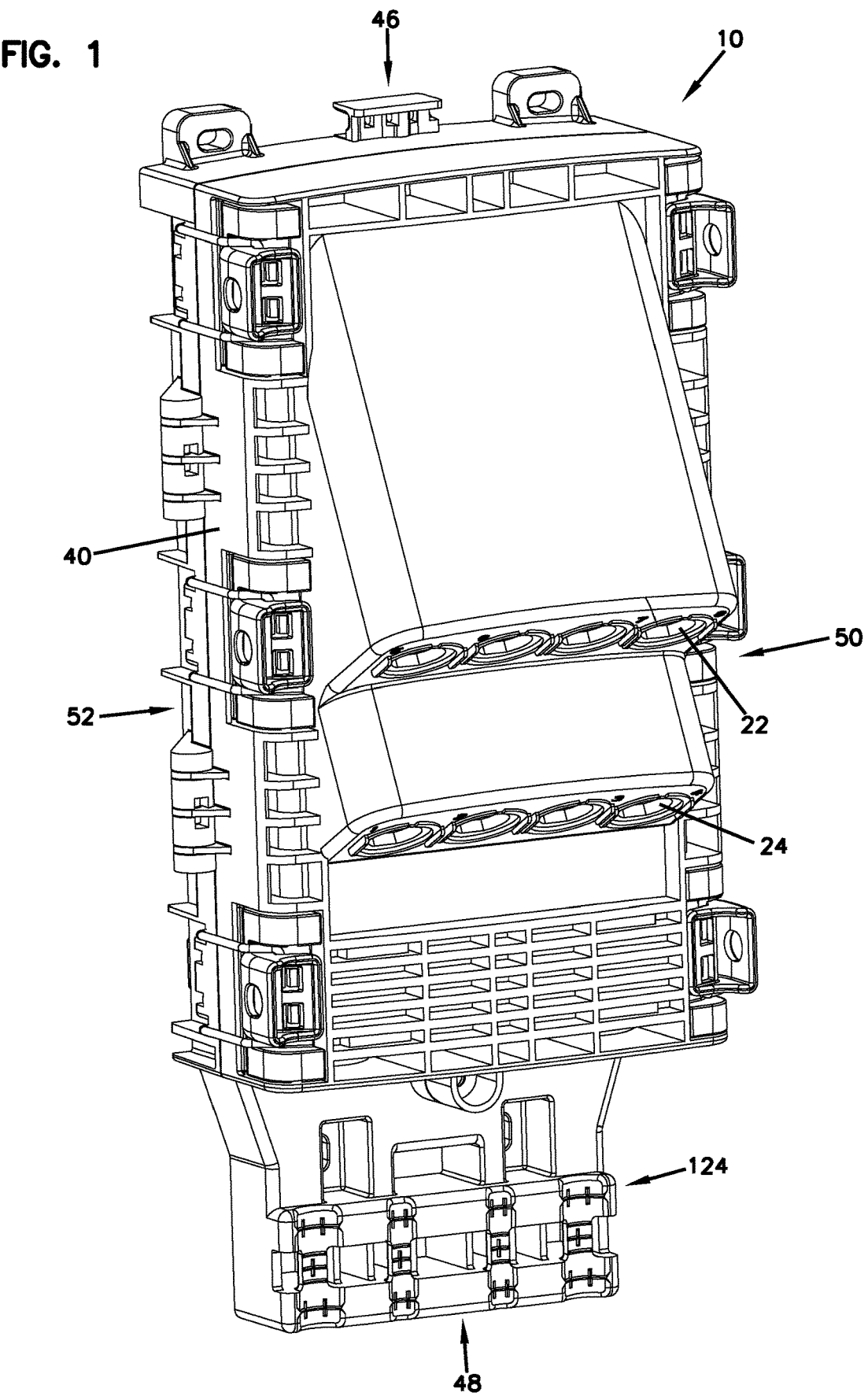
FIG. 1 is a top, front, left side perspective view of a telecommunications enclosure having features that are examples of inventive aspects in accordance with the principles of the present disclosure.
Figure 2:
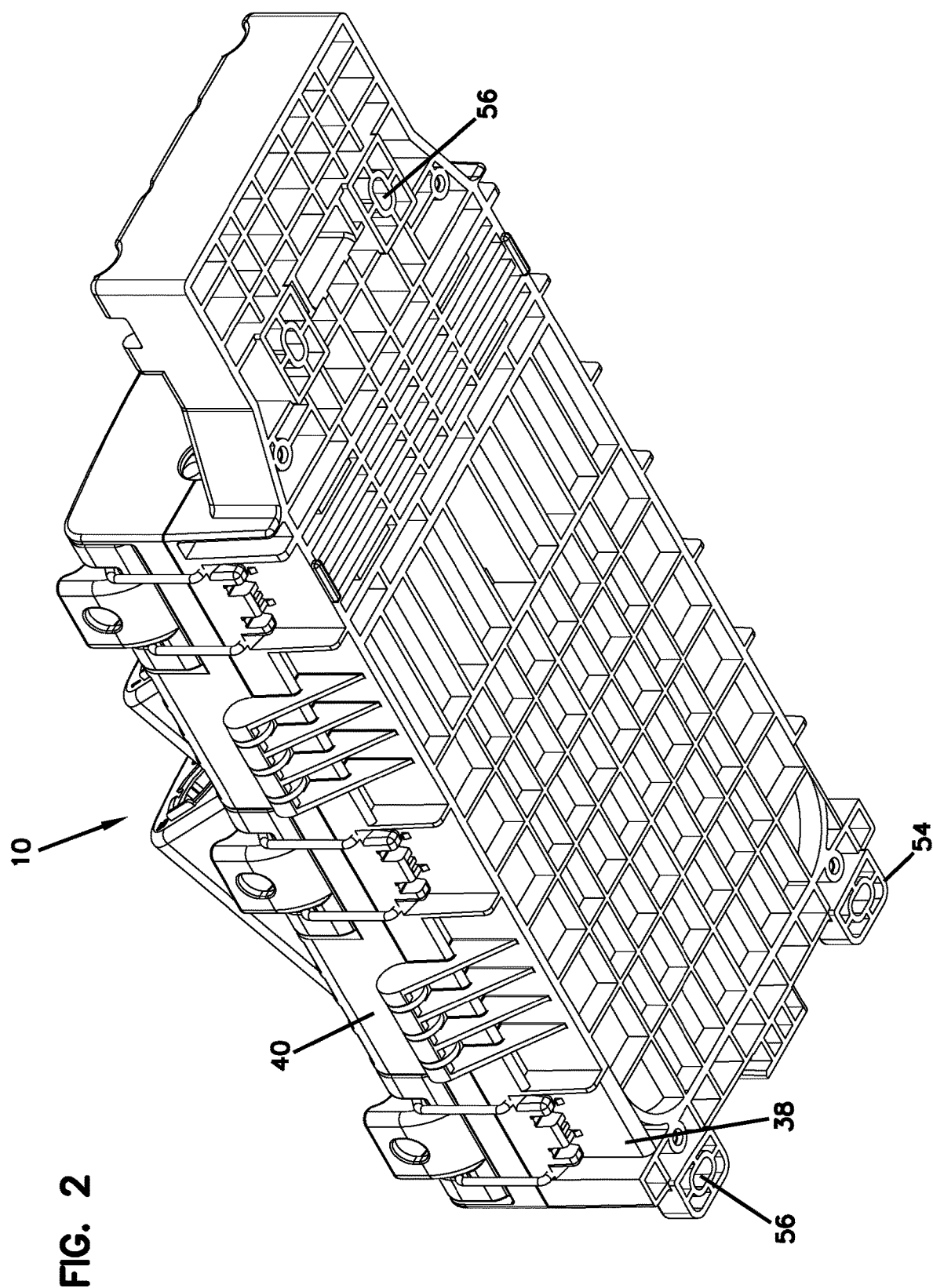
FIG. 2 is a bottom, rear, left side perspective view of the enclosure of FIG. 1.
Figure 3:
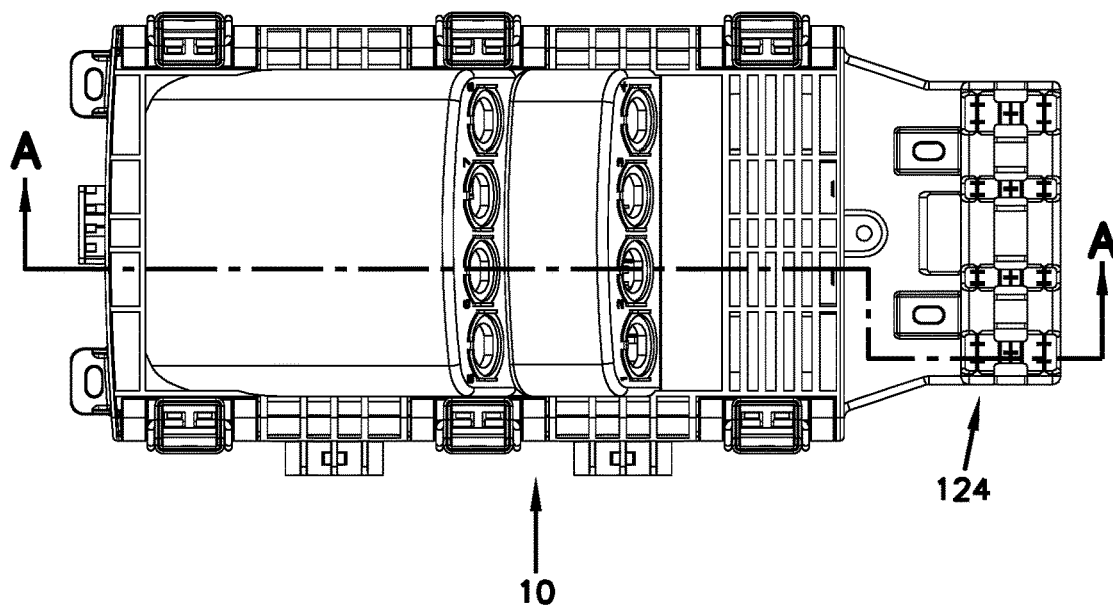
FIG. 3 is a front view of the enclosure of FIG. 1.
Figure 4:
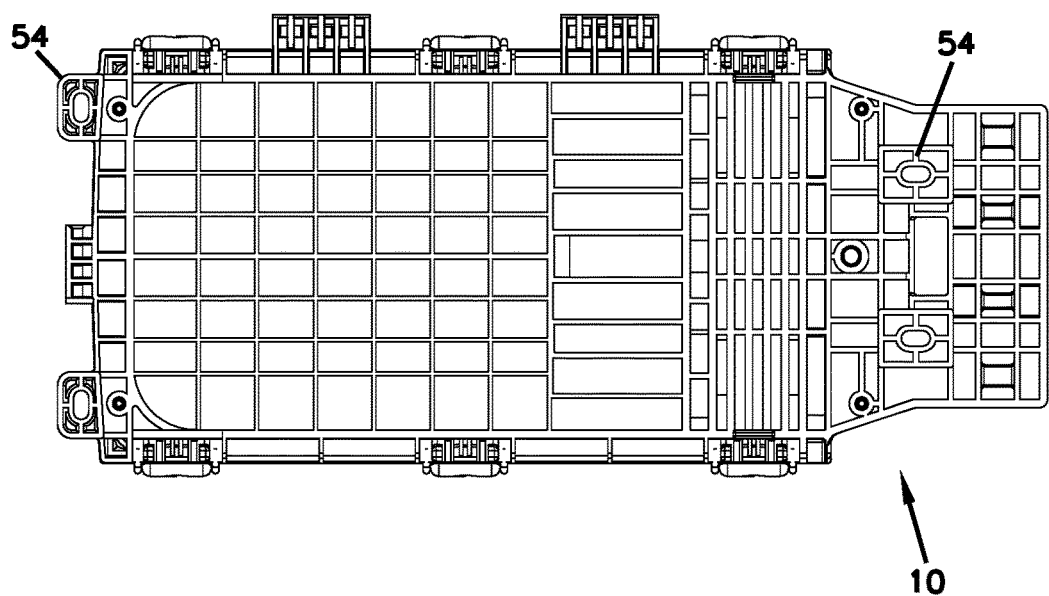
FIG. 4 is a rear view of the enclosure of FIG. 1.
Figure 5:
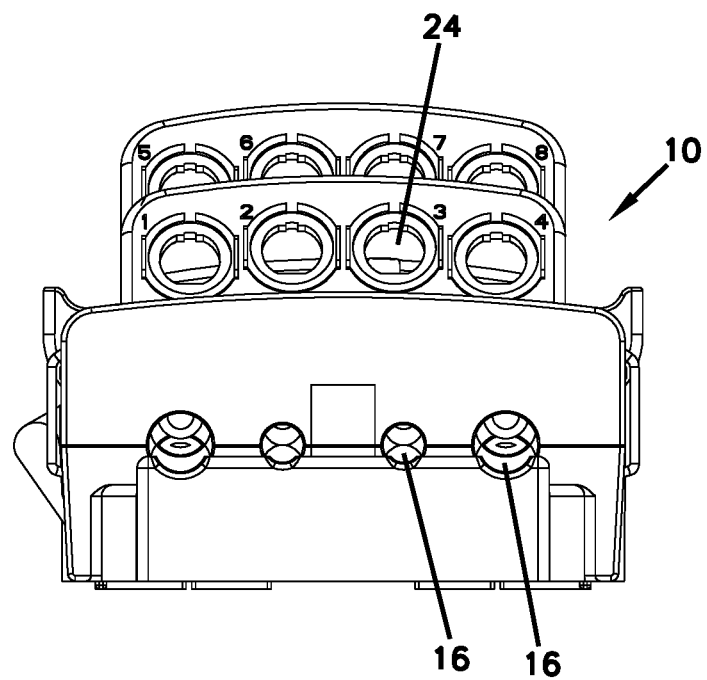
FIG. 5 is a bottom view of the enclosure of FIG. 1.
Figure 6:
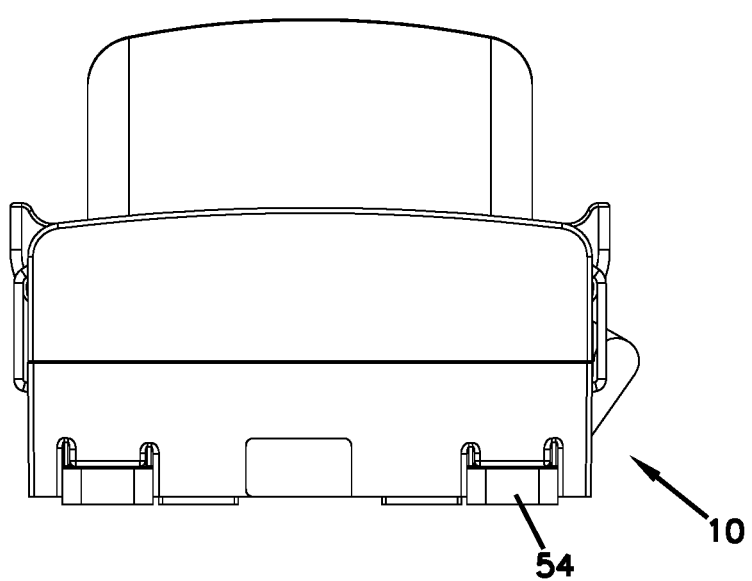
FIG. 6 is a top view of the enclosure of FIG. 1.
Figure 7:
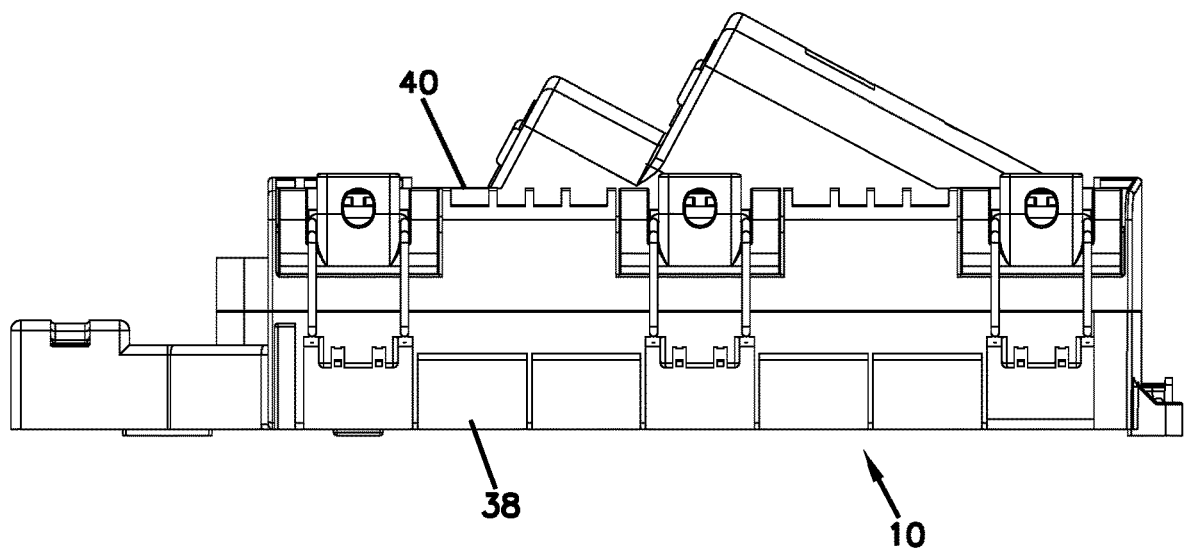
FIG. 7 is a right side view of the enclosure of FIG. 1.
Figure 8:
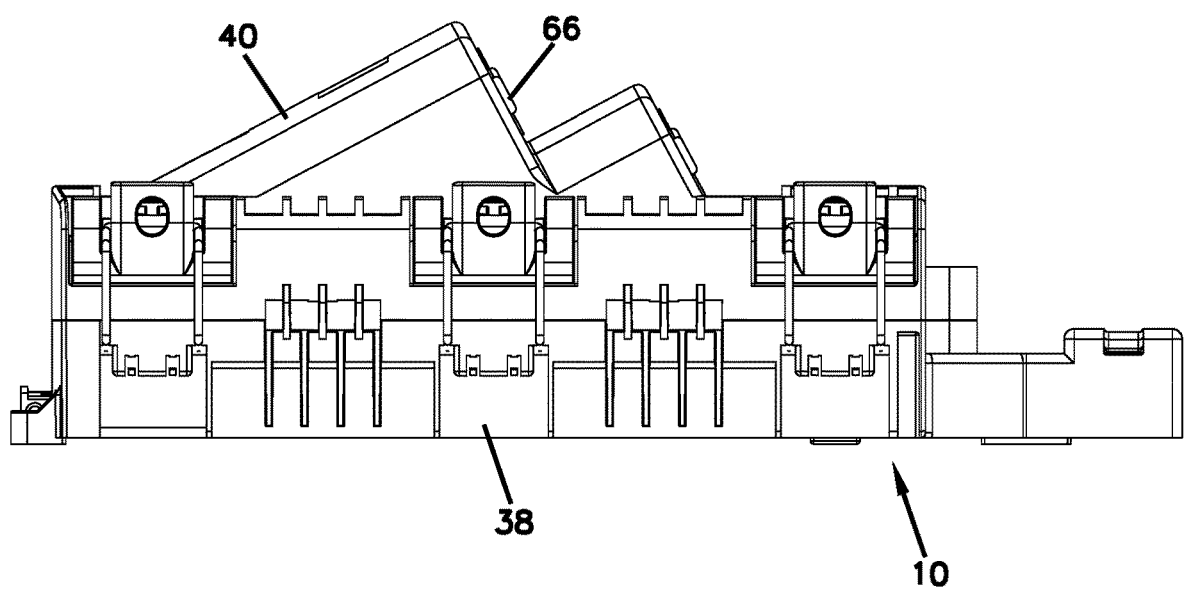
FIG. 8 is a left side view of the enclosure of FIG. 1.
Figure 9:
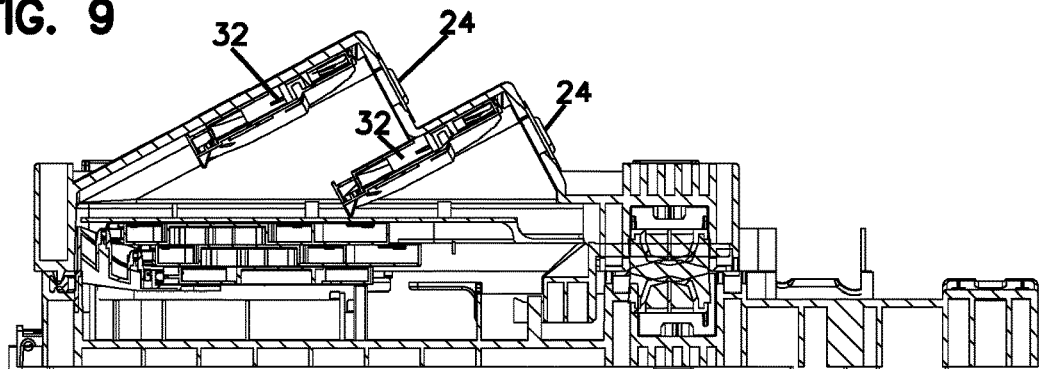
FIG. 9 is a left side cross-sectional view taken along line A-A of FIG. 3.
Figure 10:
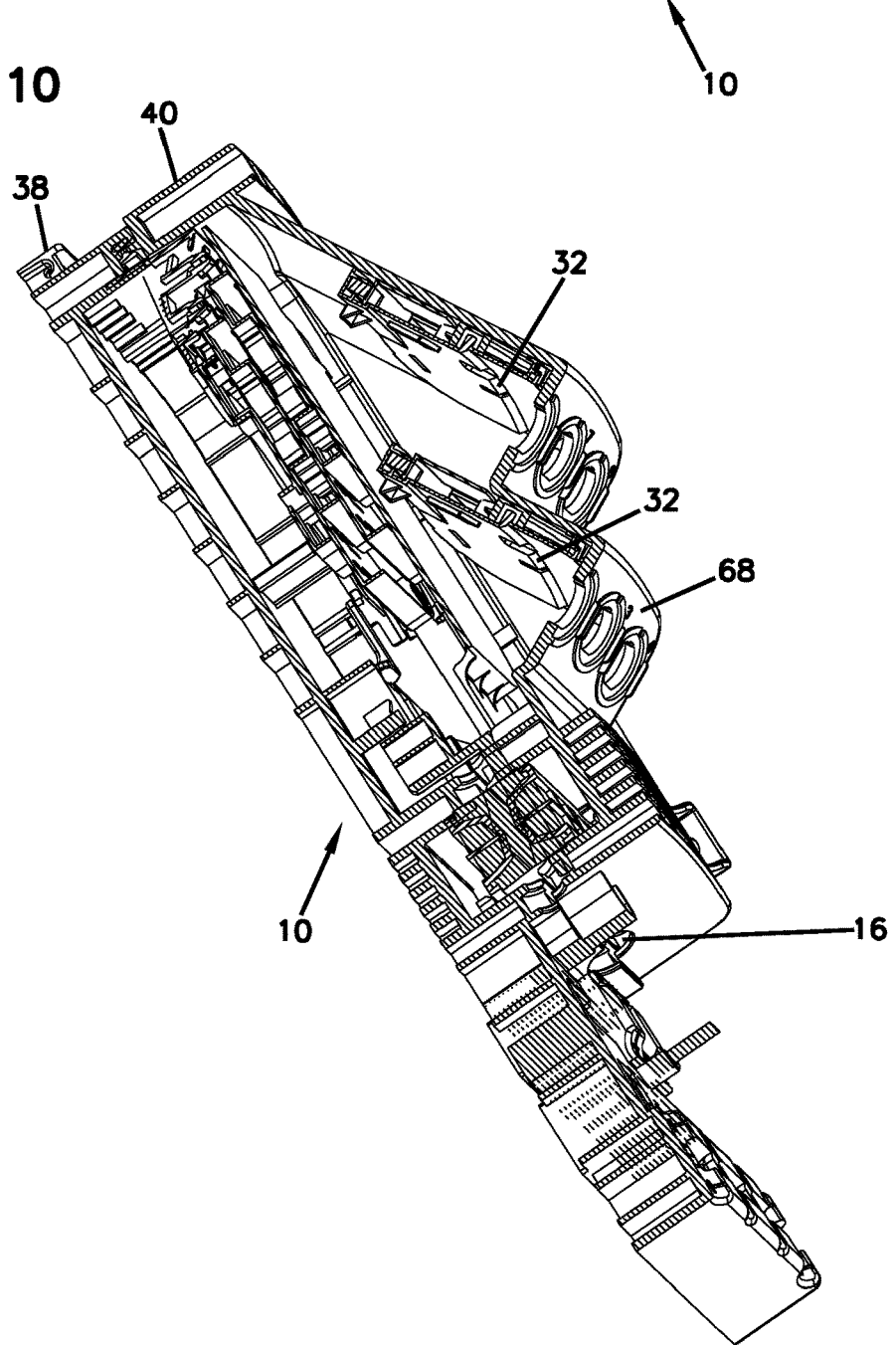
FIG. 10 is a left side perspective cross-sectional view taken along line A-A of FIG. 3.
Figure 11:
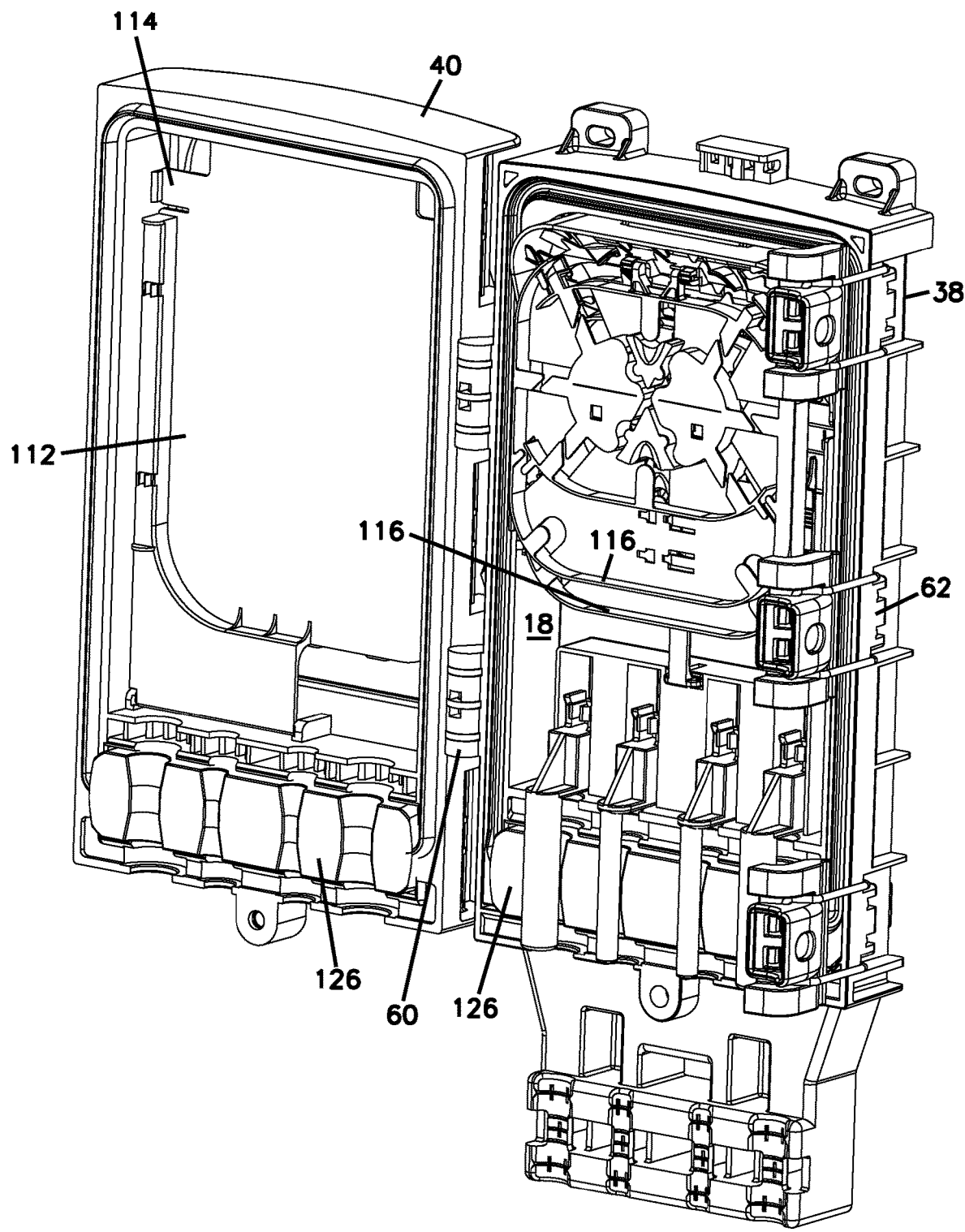
FIG. 11 is a right side perspective view of the enclosure of FIG. 1 shown with the cover of the enclosure in the open position.
Figure 12:
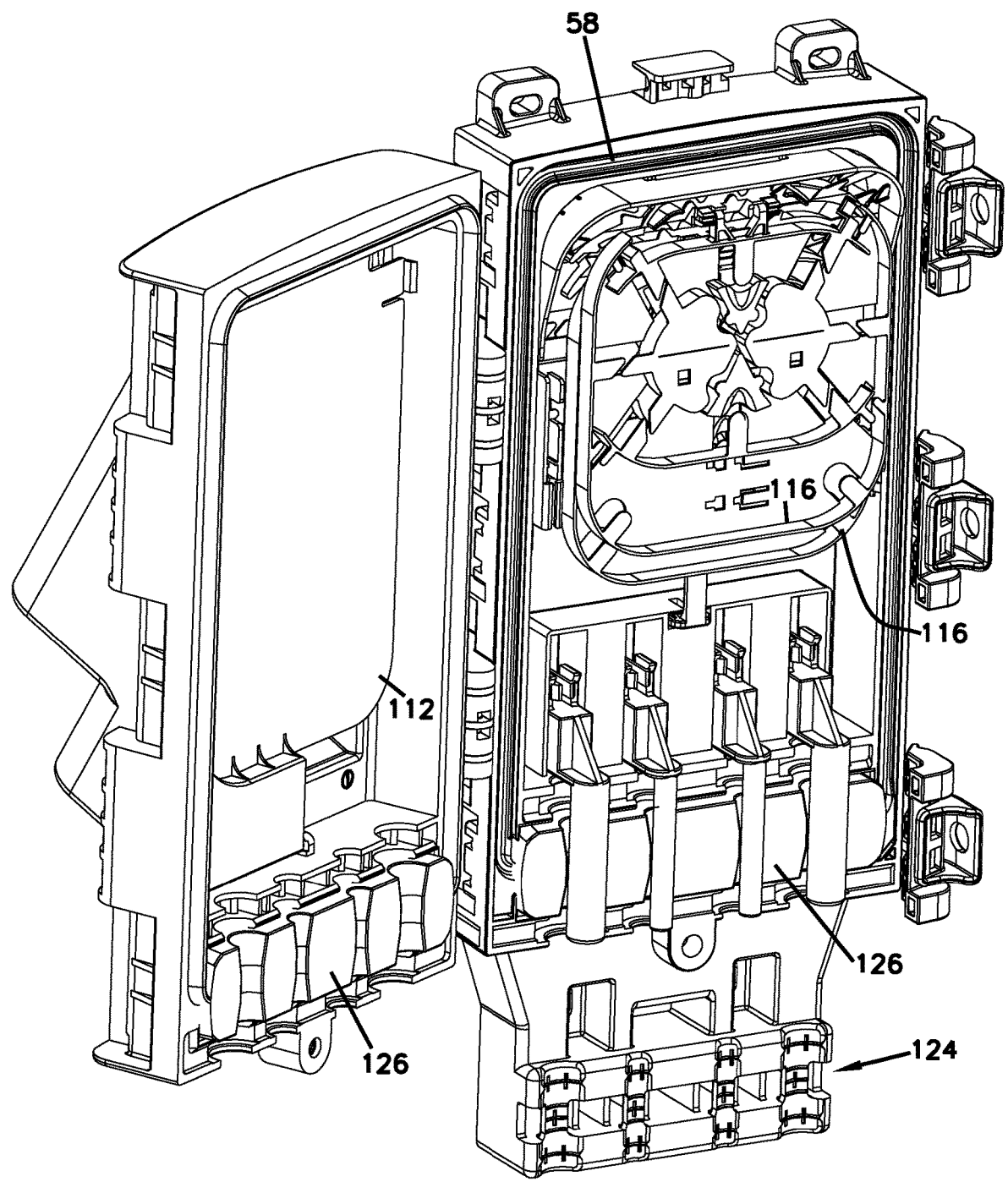
FIG. 12 is a left side perspective view of the enclosure of FIG. 11.
Figure 13:
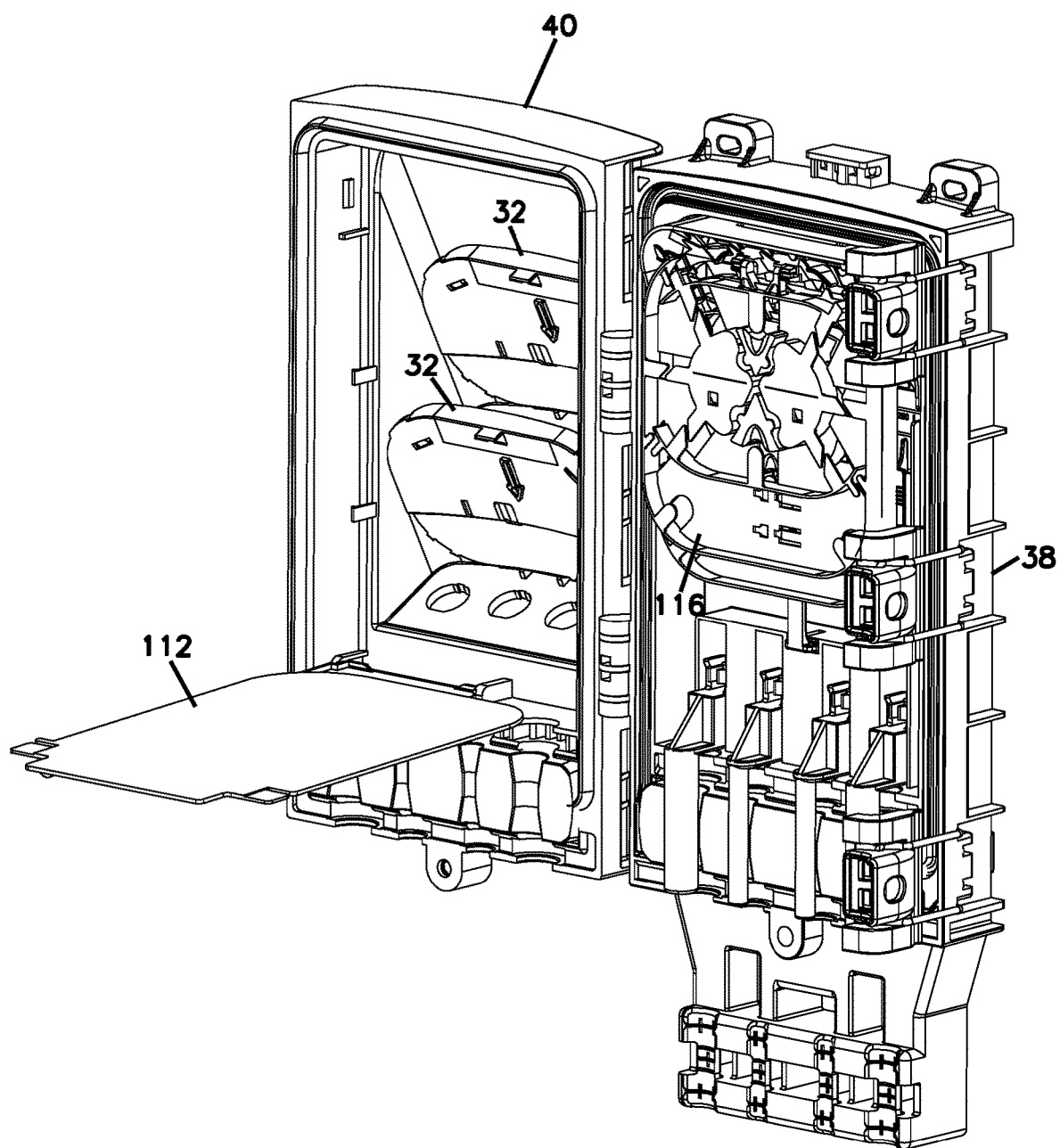
FIG. 13 illustrates the enclosure of FIG. 11 with the splitter module protection cover in the open position.

Reference will now be made in detail to exemplary aspects of the present disclosure that are illustrated in the accompanying drawings. Wherever possible, the same reference numbers will be used throughout the drawings to refer to the same or like parts.

In general, the disclosure relates to a telecommunications enclosure and modular elements mounted within the enclosure, wherein the modular elements may be used for signal splitting/processing.

FIGS. 1-20 illustrate an example enclosure 10 in accordance with the principles of the present disclosure. The enclosure 10 is generally configured to be mounted to a vertical structure such as a wall or a telecommunications poll. The enclosure 10 is generally configured to connect at least one feeder fiber 12 (e.g., carried by a feeder cable 14 entering the enclosure 10) to at least two drop fibers exiting the enclosure 10. According to one example, the feeder fiber 12 may be a 250-micron fiber.

As shown in FIGS. 1-20, the example enclosure 10 defines one or more input ports 16 leading to an interior 18 of the enclosure 10. In one example, the enclosure 10 includes at least two input ports 16 for looping the feeder cable 14 within the enclosure 10. In the given example, the enclosure 10 includes four input ports 16, wherein the two outer input ports 16 may be used for looping a feeder cable 14 and the two middle input ports 16 may be used for looping a branch cable 20 as will be discussed in further detail below.

The outputs 22 of the enclosure 10 are defined by ports 24 (eight in the given example) that can be populated with optical adapters 26 (e.g., ruggedized adapters) for mating the connectorized fibers 28 coming from within the enclosure 10 to connectorized drop cables leading away from the enclosure 10. The ports 24 output signals that have been processed or split by the optical devices 30 within the enclosure 10. In certain embodiments, the enclosure 10 may be used to support a pass-through arrangement wherein the same number of fibers that enter the enclosure are output from the enclosure 10 without a power split operation. Examples of such arrangements will be discussed in further detail below.

Still referring to FIGS. 1-20, as noted above, the example enclosure 10 may house modular elements in the form of splitter modules 32 that include optical devices 30 in the form of optical splitters 34. The splitter modules 32 may be configured to receive at least one module input fiber 13 (continuing the same signal as the feeder fiber 12) and output a plurality of connectorized pigtails 28. Each splitter module 32 defines a housing 36 enclosing the optical splitter 34. Signals carried by the module input fiber 13 are split (e.g., power split) onto the output pigtails 28 by the optical splitter 34. Each output pigtail 28 may have a connectorized end that exits the example enclosure 10 via the ruggedized adapters 26 as noted above.

Still referring to FIGS. 1-20, the enclosure 10 defines a base 38 and a cover 40 coupled to the base 38. The enclosure 10 has a front 42, a rear 44, a top 46, a bottom 48, a right side 50, and a left side 52. In the example shown, the base 38 defines the rear 44 of the enclosure 10, and the cover 40 defines the front 42 of the enclosure 10. However, the terms "front," "rear," "top," and "bottom" are not intended to be limited and are used for clarity. The enclosure 10 can be disposed in any desired orientation.

As noted above, the base 38 may be configured to be mounted to a structure (e.g., a wall or other surface). For example, the base 38 can include one or more mounting structures in the form of mounting flanges 54 for mounting to a wall. In the depicted embodiment, the mounting flanges 54 are formed integrally with the base 38 of the enclosure 10, as shown in FIGS. 1-4. When the enclosure 10 needs to be mounted to a surface such as a wall surface, fasteners can be inserted through openings 56 defined on the mounting flanges 54.

If the enclosure 10 needs to be mounted to a vertical surface that has curvature such as a telecommunications pole, a separate bracket may be attached to the base 38, wherein the bracket may include loops for use with straps in tying the enclosure 10 to the pole.

Now referring to FIGS. 11-20, the cover 40 is configured to pivot relative to the base 38 between a closed position and an open position. The cover 40 and the base 38 cooperate to define the interior 18 when the cover 40 is in the closed position. The base 38 and cover 40 also cooperate to activate an enclosure gasket 58 when closed. The enclosure gasket 58 inhibits ingress of contaminants through a seam between the base 38 and the cover 40. User access to the enclosure interior 18 is provided when the cover 40 is in the open position.

To provide the pivoting motion, the base 38 and the cover 40 can include hinge members 60 that cooperate to define a hinge axis. In some implementations, the cover 40 can be locked in the closed position. For example, a clasp arrangement 62 can hold the cover 40 in the closed position relative to the base 38. In other implementations, the cover 40 can be latched relative to the base 38. In still other implementations, a padlock or other type of lock can retain the cover 40 in the closed position.

In some implementations, the optical adapters 26 that are used for outputting the signals from the enclosure 10 may be carried by the cover 40 so that inner ports 64 of the adapters 26 are accessible from an interior side of the cover 40, and outer ports 66 of the adapters 26 are accessible from an exterior side of the cover 40. In certain implementations, the adapters 26 are angled so that the outer ports 66 face towards the input ports 16 of the enclosure 10 (please see FIGS. 1, 3, and 5). For example, the cover 40 can define one or more adapter mounting surfaces 68 and one or more module mounting surfaces 70. The adapter mounting surfaces 68 define the output openings/ports 24. In certain examples, the adapter mounting surfaces 70 are angled towards the input openings 16 of the enclosure 10.

As noted above, in some implementations, the splitter modules 32 that carry the optical splitters 34 may be carried by the cover 40. For example, the inner side of the cover 40 may define one or more pockets 72 for receiving the splitter modules 32, wherein the pockets 72 are bordered on one side by the module mounting surfaces 70. In certain implementations, each pocket 72 is disposed between a row of the output ports 24 and the interior side of the module mounting surface 70. A splitter module 32 may be shaped to fit within the pocket 72.

In some implementations, the cover 40 defines multiple pockets 72 for receiving multiple modules 32. In certain examples, the cover 40 defines a pocket 72 for each row of the optical adapters 26. In the example shown, the cover 40 defines two pockets 72 and two rows of optical adapters 26. One splitter module 32 is disposed at each pocket 72 in the given example. Output pigtails 28 from each splitter module 32 are connected to the adapters 26 in the respective row.

Figure 15:
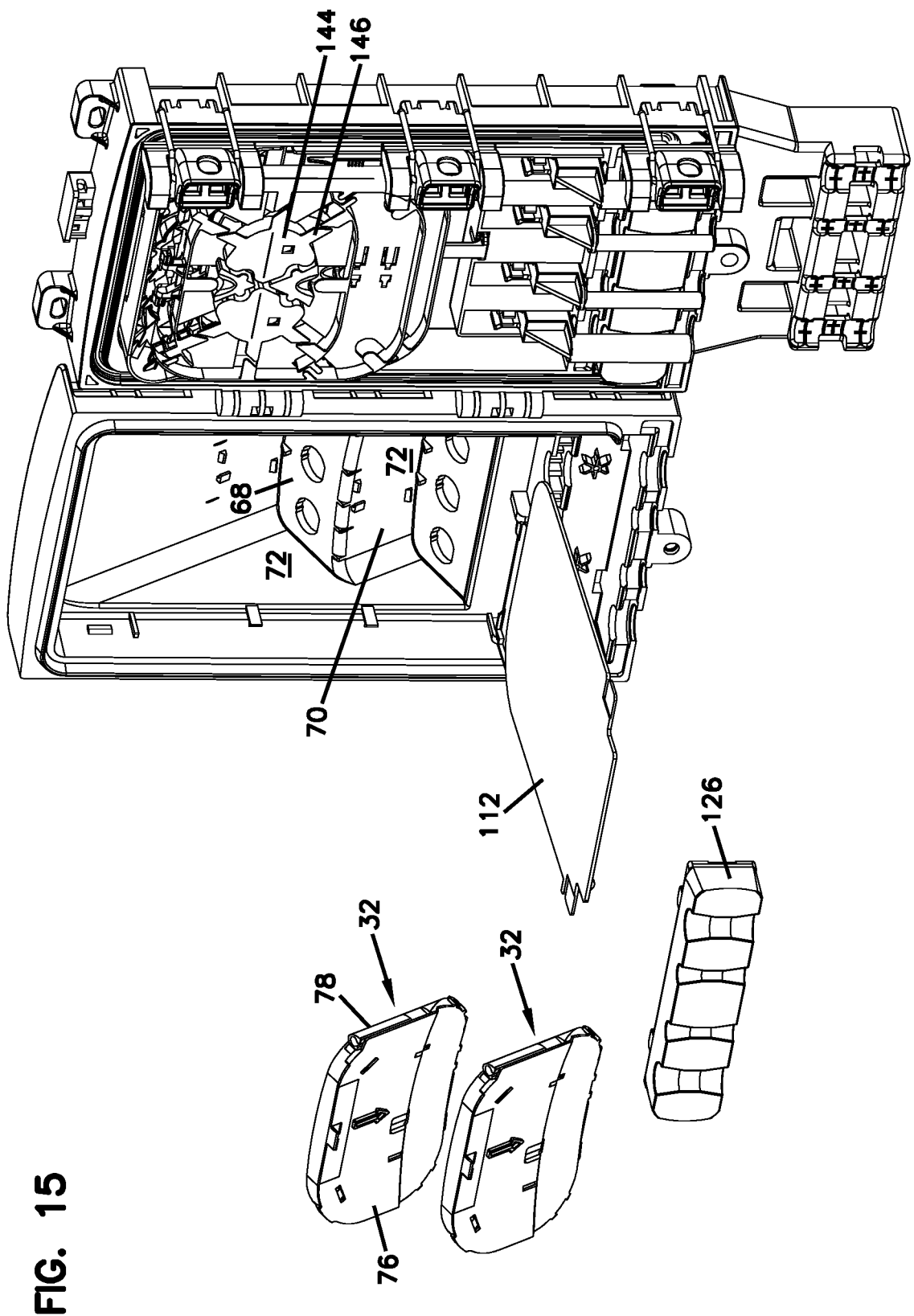
FIG. 15 illustrates the enclosure of FIG. 14 with the splitter modules of the enclosure also in an exploded configuration.
Figure 16:
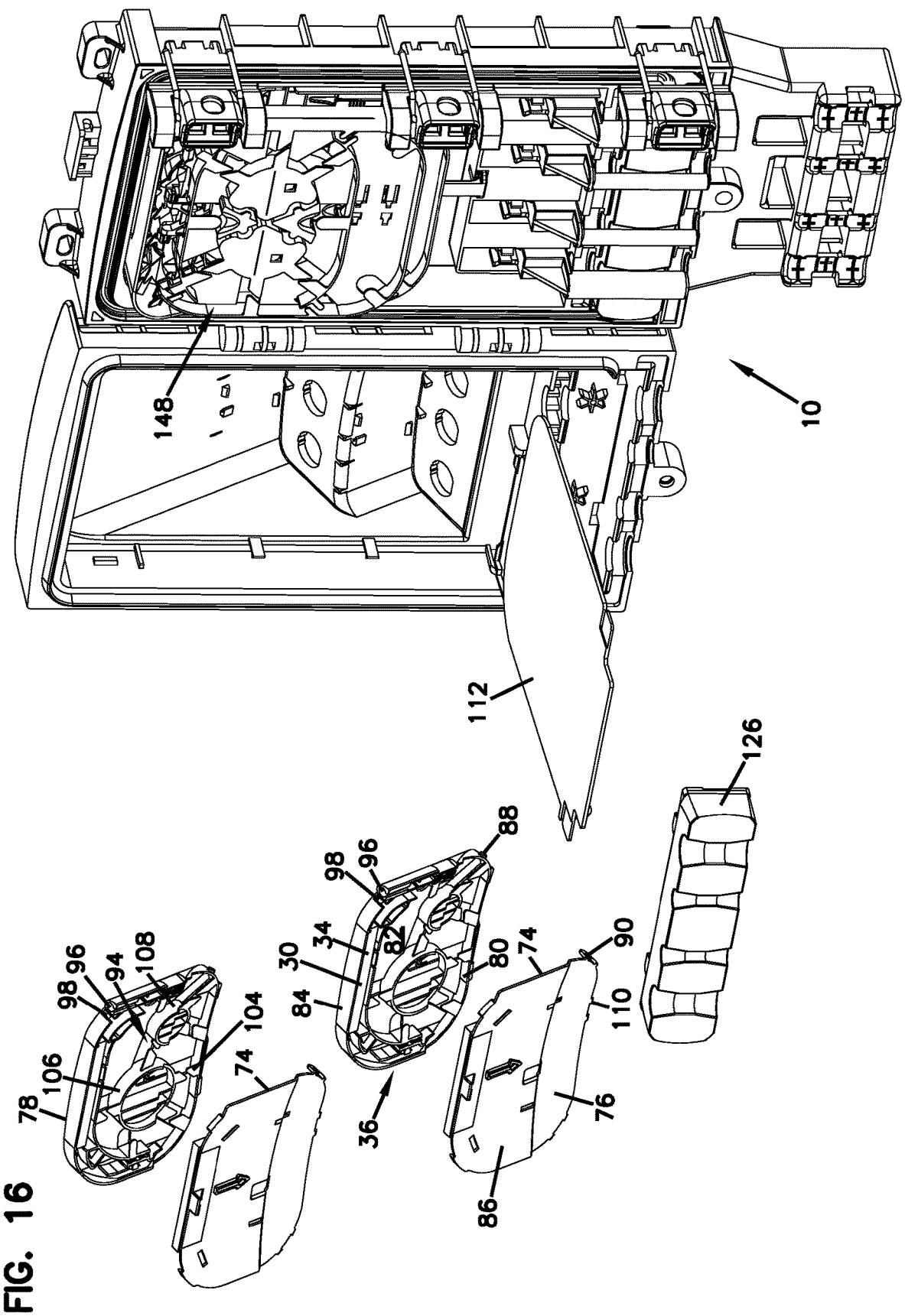
FIG. 16 illustrates the enclosure of FIG. 15 with the covers of the splitter modules removed therefrom to show the internal features thereof.

The modular elements in the form of splitter modules 32 are shown in an exploded configuration off the enclosure 10 in FIGS. 15 and 16. In FIG. 16, the housings 36 of the modular elements 32 are shown without covers 74 thereof to illustrate the internal features.

As noted above, each splitter module 32 defines a module housing 36. The module housing 36 defines a first major surface 76 connected to a second major surface 78 by a circumferential edge 80. The module housing 36 defines an interior 82 between the major surfaces 76, 78.

As shown in FIG. 16, the module housing 36 includes a first part 84 and a second part 86 that cooperate to define the interior 82. In some implementations, the first part 84 defines one of the major surfaces 76, 78 and the circumferential edge 80, and the second part 86 defines the other of the major surfaces 76, 78. In other implementations, both parts 84, 86 may define the circumferential edge 80. In the example shown, the first part 84 defines the second major surface 78 and the circumferential edge 80, and the second part 86 defines the first major surface 76. In some implementations, the first part 84 is configured to carry an optical device such as the optical splitter 34, and the second part 86 is provided as a removable cover 74 that covers an open side of the first part 84 to enclose the splitter 34.

In some implementations, various connecting structures hold the second part 86 to the first part 84. For example, in certain implementations, latching tabs 88 may extend from one of the parts 84, 86 and engage recesses 90 defined in the other of the parts 84, 86.

As shown in FIG. 16, the interior 82 of the module housing 36 can include an optical device (e.g., splitter) mounting region 92 and a fiber routing region 94. In the depicted embodiment, a fiber input opening 96 is at a right, top corner of the module housing 36. Outlet openings 98 may be defined at the top right and left corners of the module housing 36 by the circumferential edge 80. In other embodiments, the outlet openings 98 may be defined by the cover 74 (such as in the example of the module 32 shown in FIGS. 33-35). In the example shown in FIGS. 15-16, an optical device such as a splitter 34 may be disposed in the optical device mounting region 92, which is shown to be located between the fiber routing region 94 and the circumferential edge 80 defining the top end of the module 32. In other examples, however, the splitter 34 can be mounted anywhere within the interior 82 of the housing 36.

The input opening 96 is configured with an anchor 100 for securing a tube 102 carrying the module input fiber or fibers 13. The anchor 100 defines a tube stop 198 for limiting slidability of the tube 102 during insertion of the tube 102 into the input opening 96. The input opening 96 provides access into the interior 82 of the splitter module housing 36.

Within the interior 82 of the splitter module housing 36, the fiber 12 is led from the input opening 96 directly into the fiber routing region 94. The fiber routing region 94 defines cable management tabs 104 that retain the fiber(s) 12, 28 within the fiber routing region 94. A large spool 106 and a smaller spool 108 are defined in the fiber routing region 94 to provide for different routing options for the fiber(s) 12, 28 routed within the module 32.

When the module 32 is a splitter module that includes a fiber optic splitter 34, output pigtails 28 are connected to an output end of the splitter 34. The output pigtails 28 are routed from the splitter 34 towards the outlet openings 98 of the module 32. Some of the output pigtails 28 can be wound around the spool arrangement consisting of the large spool 106 and the smaller spool 108 to direct the output pigtails 28 to the right outlet opening 98, and others of the output pigtails 28 can be wound around the spool arrangement to direct the output pigtails 28 to the left outlet opening 98. Accordingly, the output pigtails 28 can extend out through the outlet openings 98 in different directions.

In certain implementations, the interior 82 of the splitter module housing 36 may also include a region configured to retain a splice sleeve in addition to the splitter 34. The splice region may enable a repair to be made to one of the fibers 12, 28 within the splitter module 32.

Figure 14:
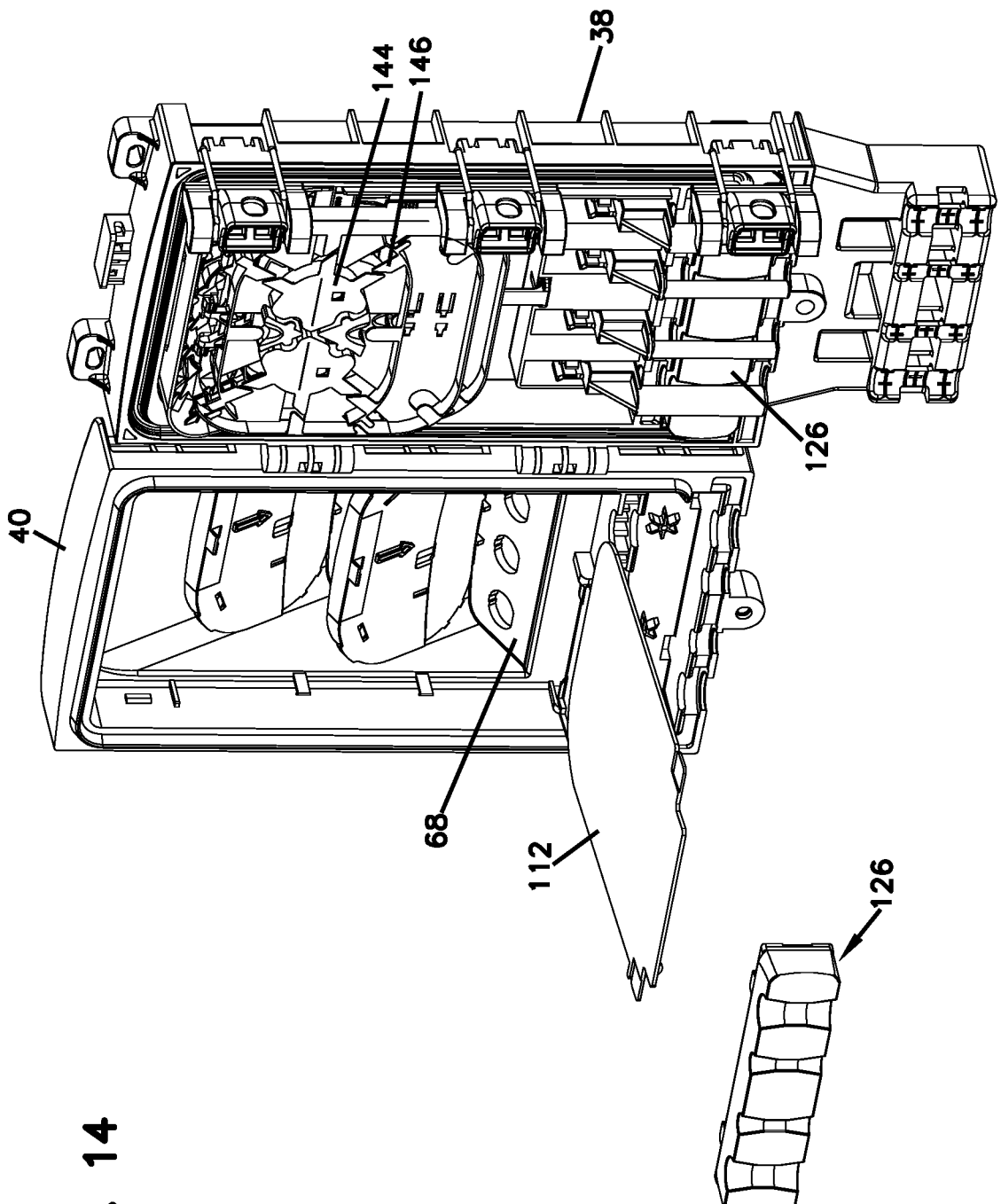
FIG. 14 illustrates the enclosure of FIG. 13 with the gel block of the cover of the enclosure in an exploded configuration.

Referring to FIGS. 14-16, the splitter module 32 may include a mounting arrangement that aids in securing the splitter module 32 within the pockets 72 defined by the cover 40 of enclosure 10 of the present disclosure. The mounting arrangement may include catches 110 that extend outwardly from the splitter module housing 36 (please see FIGS. 33-34).

The enclosure 10 may define structures in each pocket 72 that mate with the catches 110 of the splitter modules 32 for receiving the modules 32.

For further details relating to examples of mounting arrangements and methods of mounting the splitter modules 32 within the pockets 72 of the cover 40 of the enclosure 10, please refer to International Publication No. WO 2015/150204, the entire disclosure of which is incorporated herein by reference.

Figure 32:
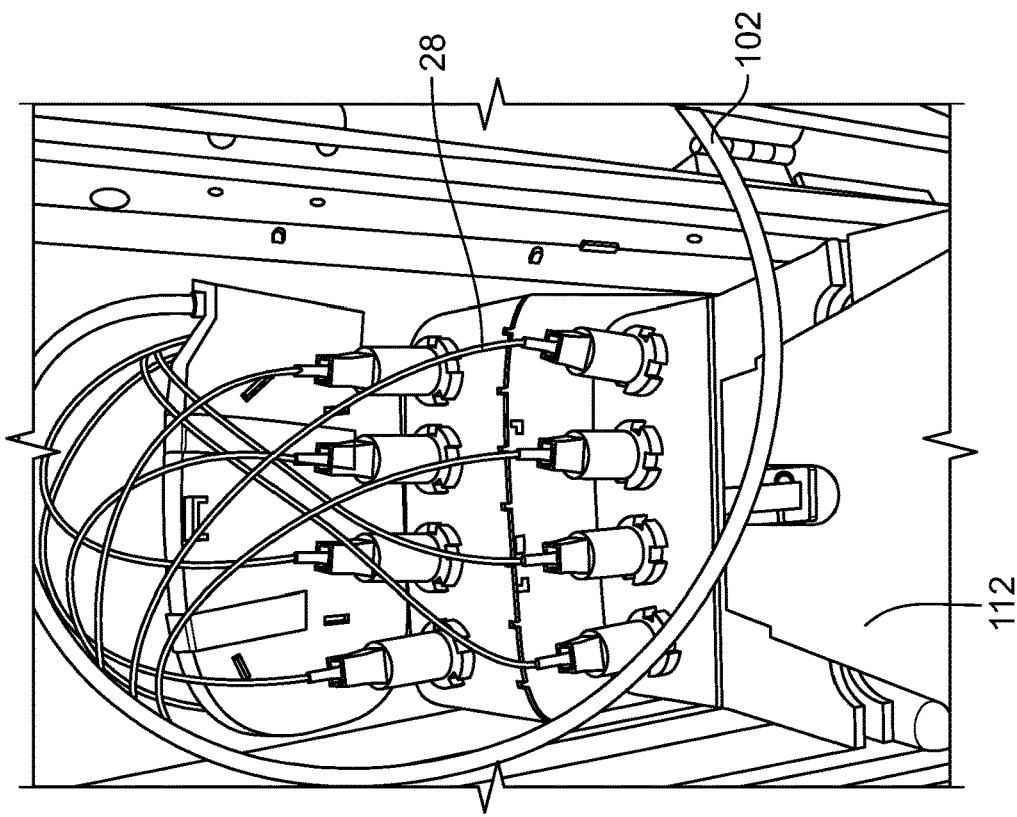
FIG. 32 illustrates the enclosure of FIG. 31 with all of the ruggedized fiber optic adapters of the cover populated with connectorized output pigtails extending from a splitter module.

The splitter modules 32 within the cover 40 of the enclosure 10 and the fiber optic adapters 26 mounted on the cover 40 of the enclosure 10 may be protected by a hingable protection cover 112 that is pivotally mounted to the cover 40 of the enclosure 10 as seen in FIGS. 14-16. The protection cover 112 is hinged to the cover 40 of the enclosure 10 adjacent the lower part of the cover 40 and defines tabs 114 adjacent the top thereof for latching with the cover 40 of the enclosure 10 adjacent the top side. As shown in FIG. 32, when a tube 102 carrying a module input fiber 13 is routed from the base 38 of the enclosure 10 toward the splitter modules 32 at the cover 40 of the enclosure 10, the tube 102 is routed under the protection cover 112 to help retain the tube 102 within the cover 40 of the enclosure 10.

Figure 33:
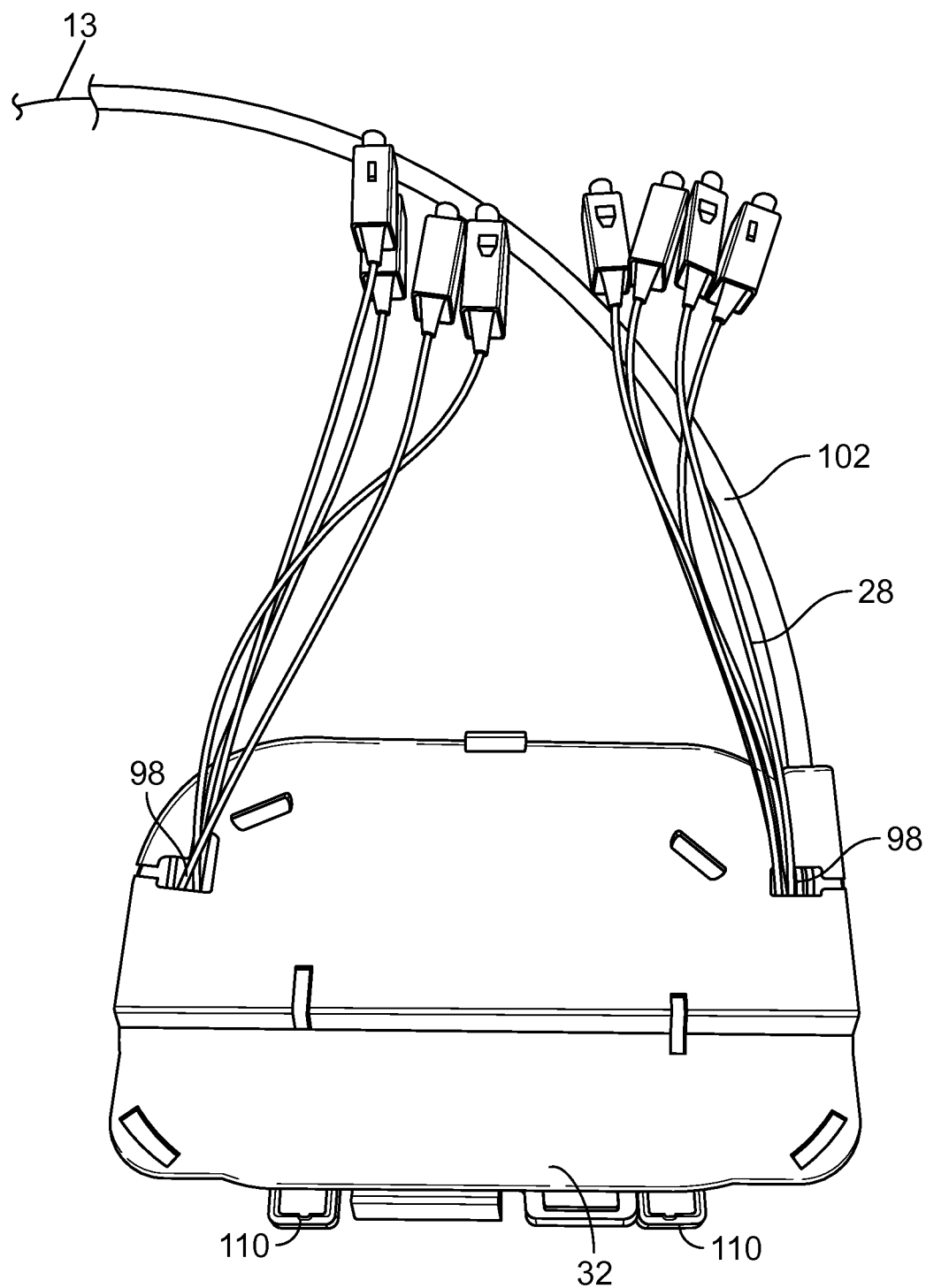
FIG. 33 illustrates a module similar to the splitter modules usable in the enclosure of FIGS. 1-20, the module shown with a straight-through cable routing configuration with all of the input fibers being output as connectorized pigtails.
Figure 35:
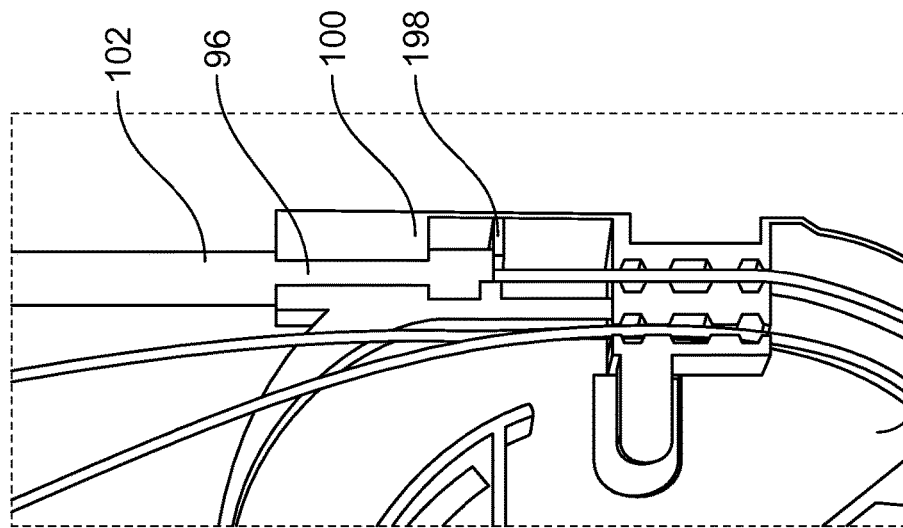
FIG. 35 is a close up view of the tube input location of the module of FIG. 34.
Figure 34:
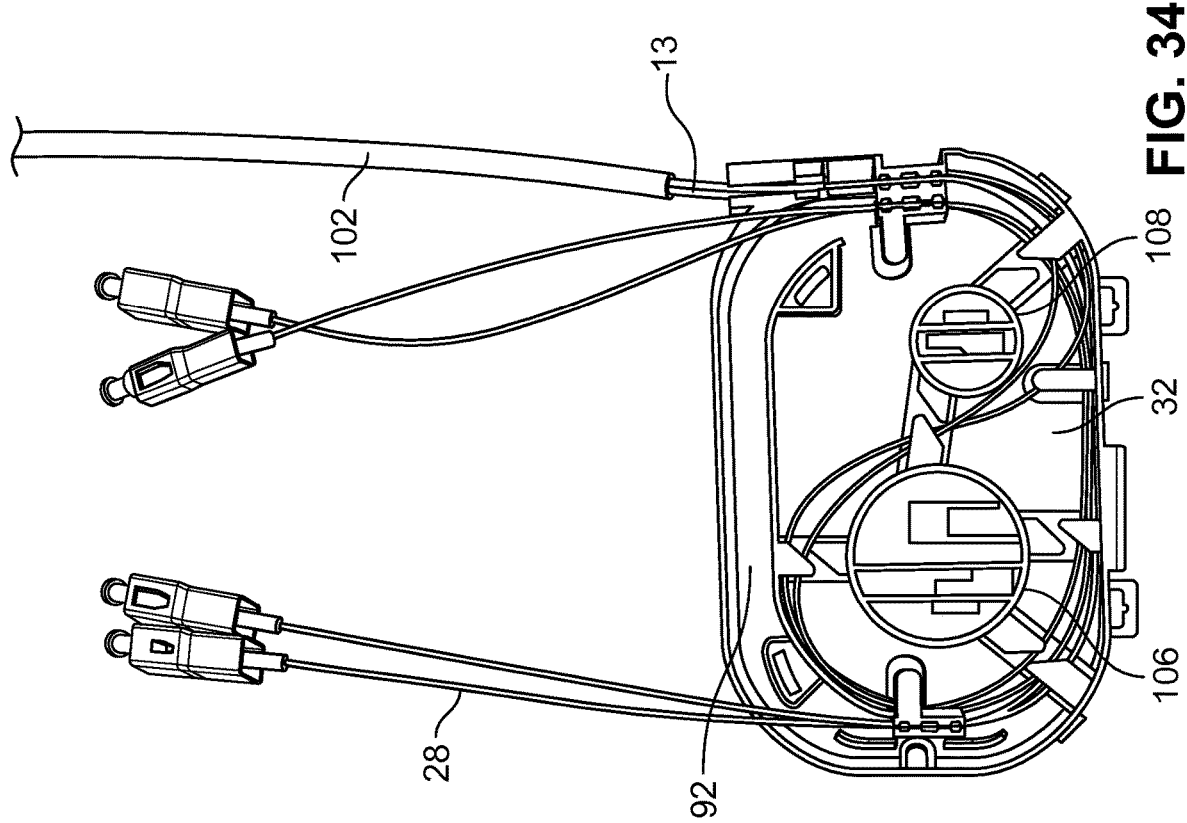
FIG. 34 illustrates the module of FIG. 33 without the cover thereof to show the internal cable routing within the module.

Also, as discussed previously, even though the modular elements within the enclosure 10 have been discussed as modules that house optical elements in the form of splitters 34, in other embodiments, the modules 32 may provide straight-through cable routing. FIGS. 33-35 illustrate a module similar to the splitter modules 32 usable in the enclosure, the module shown with a straight-through cable routing configuration with all of the module input fibers 13 being output as connectorized pigtails 28. Instead of a single fiber 13 that is input into the module 32 being power split into a plurality of output pigtails 28 by an optical splitter 34, the module shown in FIGS. 33-35 provides cable management for fibers 13 that are passed straight through. In the depicted example in FIG. 33, a tube 102 carrying eight fibers 13 is secured to the module housing 36. After the fibers 13 are routed around the cable management structures provided in the module, the fibers 13 are output from the module as connectorized pigtails 28. The module illustrated in FIG. 33 is configured to populate all of the ruggedized adapters 26 on the cover 40 of the enclosure 10, whereas the module in FIG. 34 is acting as a straight-through module for a tube 102 carrying only four fibers 12. FIG. 35 illustrates the tube anchor portion 100 of the module housing 36 wherein a tube 102 carrying the module input fibers 13 can be slidably mounted until reaching the tube stop 198 in the anchor region 100.

Thus, rather than carrying power splitters 34, the modular elements located within the enclosure 10 can be used for straight-through patching.

Now referring to FIGS. 11-32, the base 38 of the enclosure 10 is used for receiving the input signals that are to be processed and for directing the input signals toward the splitter modules 32 that are located on the cover 40. As will be discussed in further detail below, the base 38 may include locations or trays 116 used for splicing fibers 12 carrying input signals to fibers (carrying the same signal as fibers 12) that lead to the splitter modules 32. The base 40 also includes a storage tray 118 positioned underneath the splice trays 116 for storing unprocessed/unused fibers. The storage tray 118 can be seen in FIG. 19.

Figure 18:
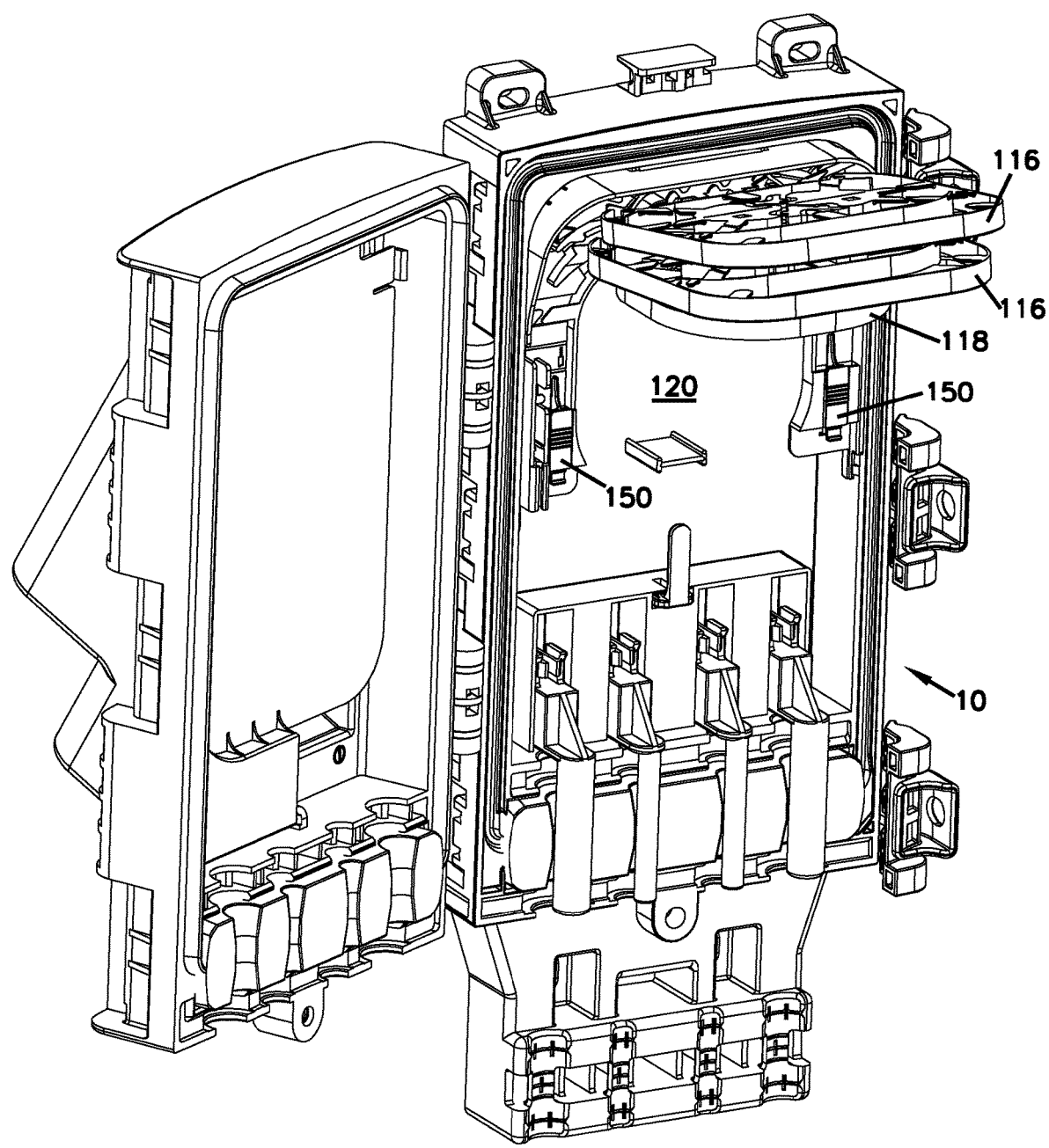
FIG. 18 illustrates the enclosure of FIG. 17 with the splice module of the enclosure mounted within the base and the storage tray and the splice trays of the splice module in a pivoted position.
Figure 21:
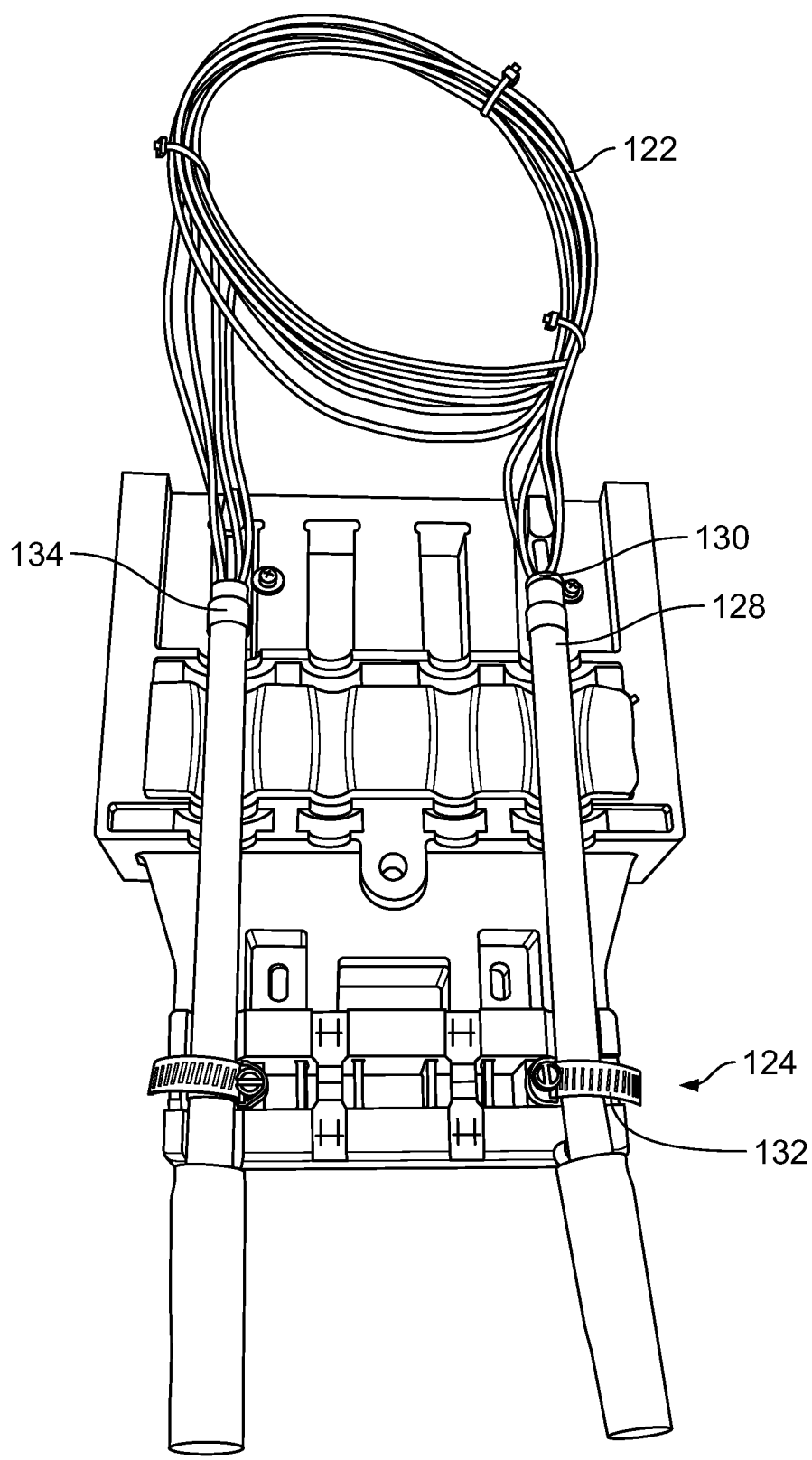
FIG. 21 illustrates the entry region of the enclosure of FIGS. 1-20 with a feeder cable loop anchored to the enclosure.
Figure 22:
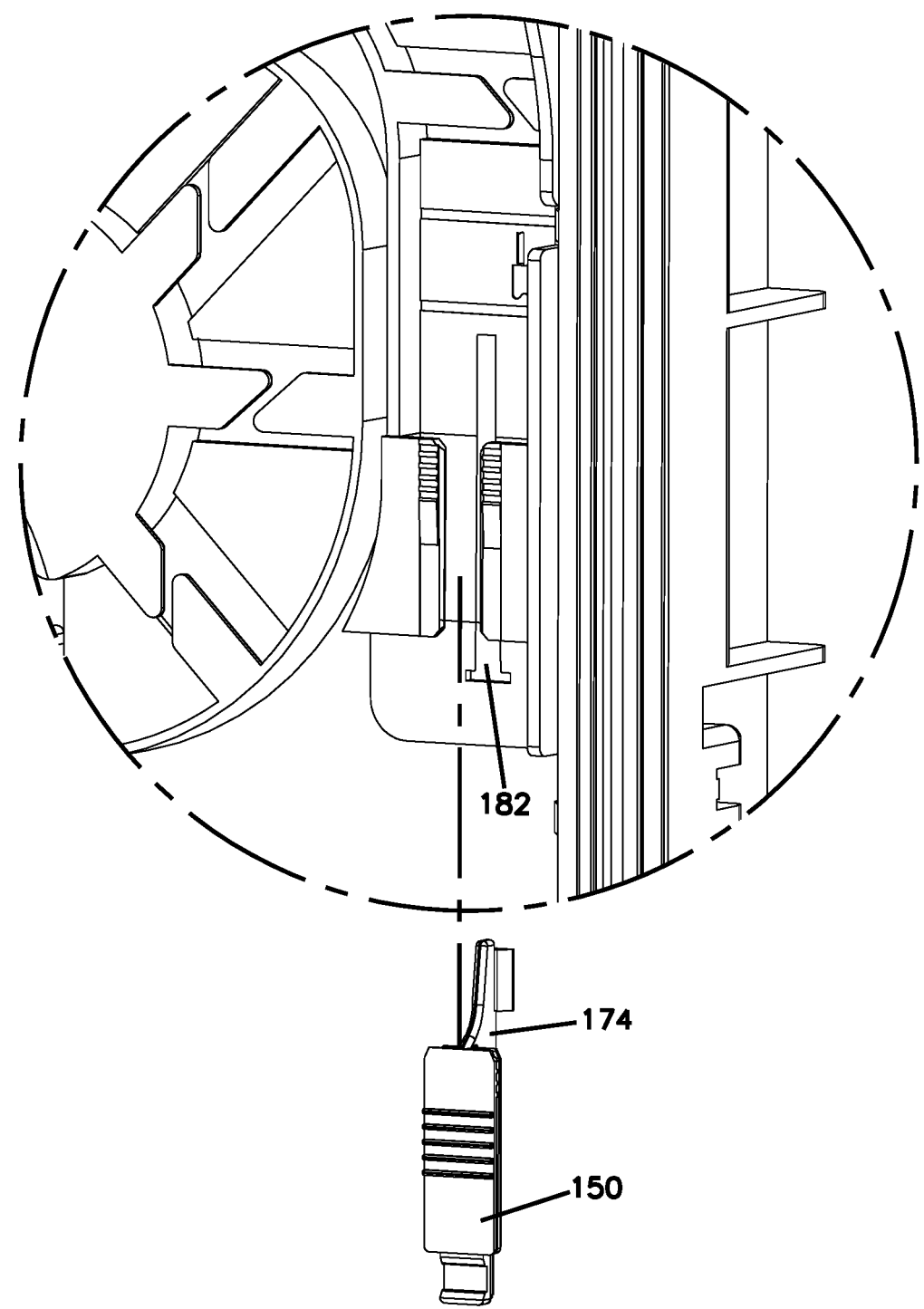
FIGS. 22-26 illustrate the slidable mounting of a tube holder to the base of the enclosure for securing the tubes of feeder or branch cables to the enclosure.
Figure 23:
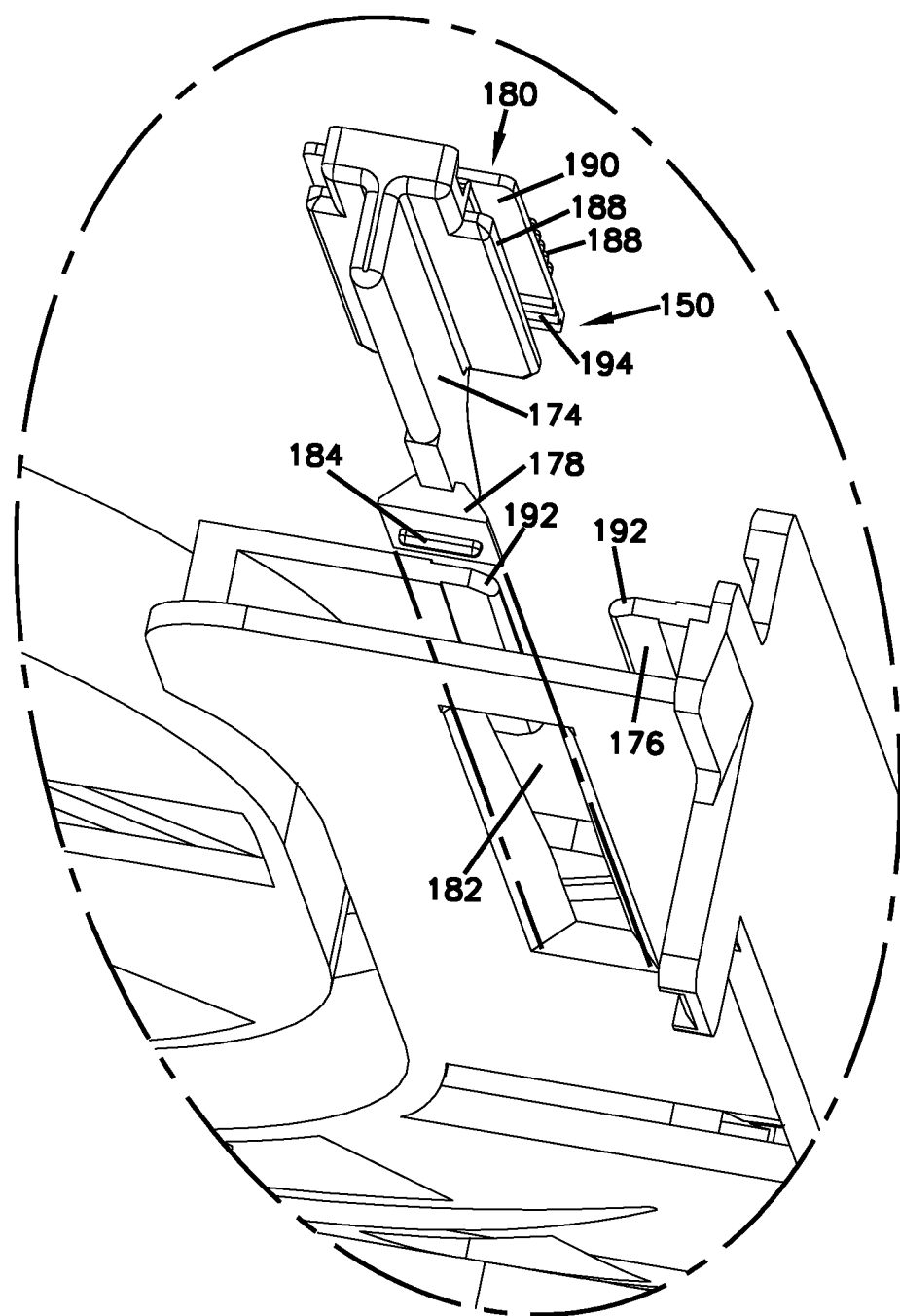
Figure 24:
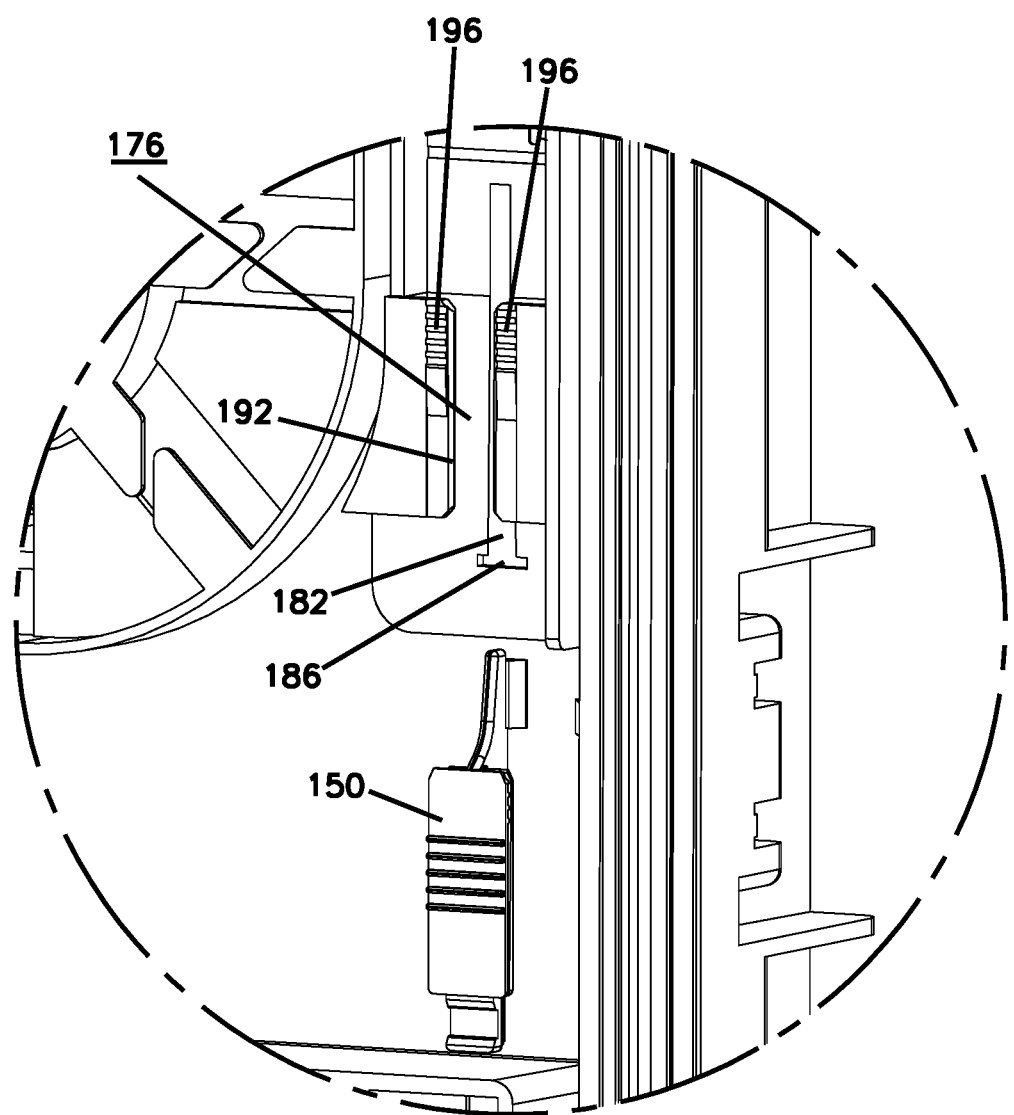
Figure 25:
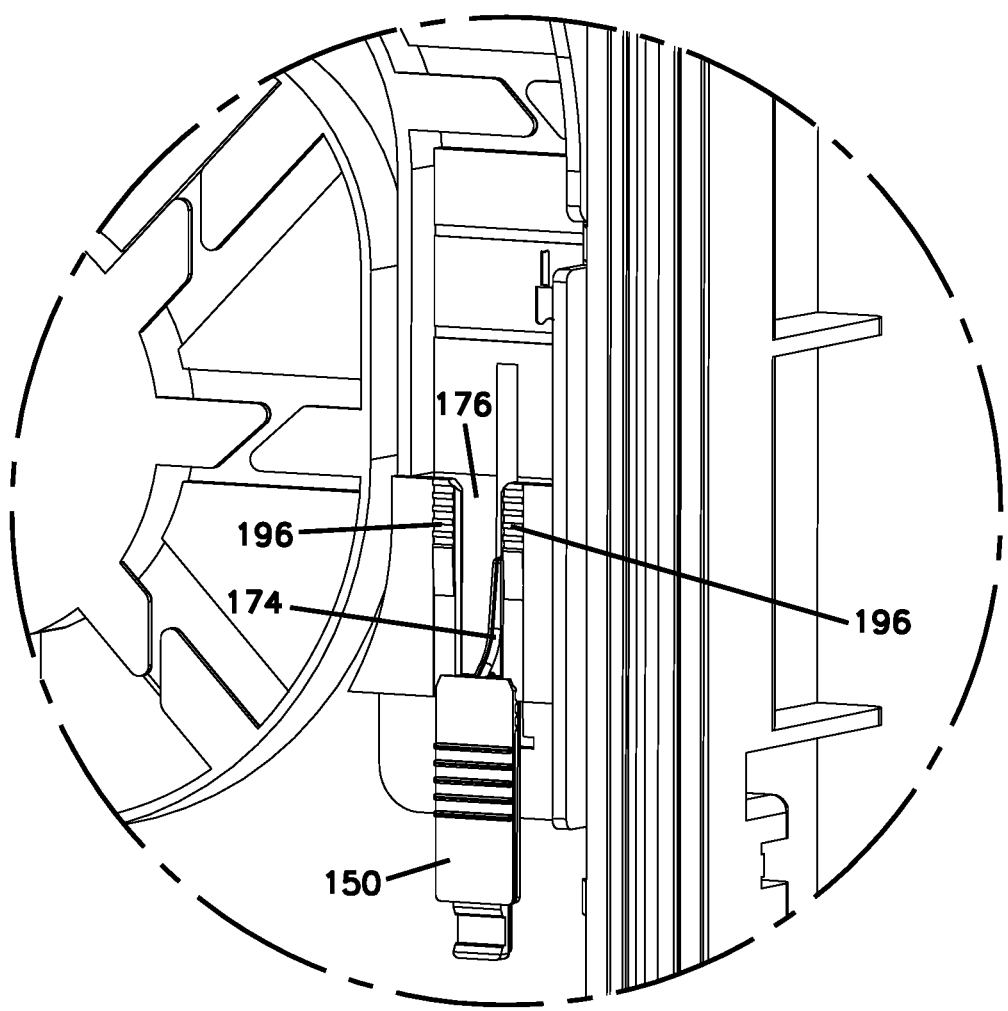
Figure 26:
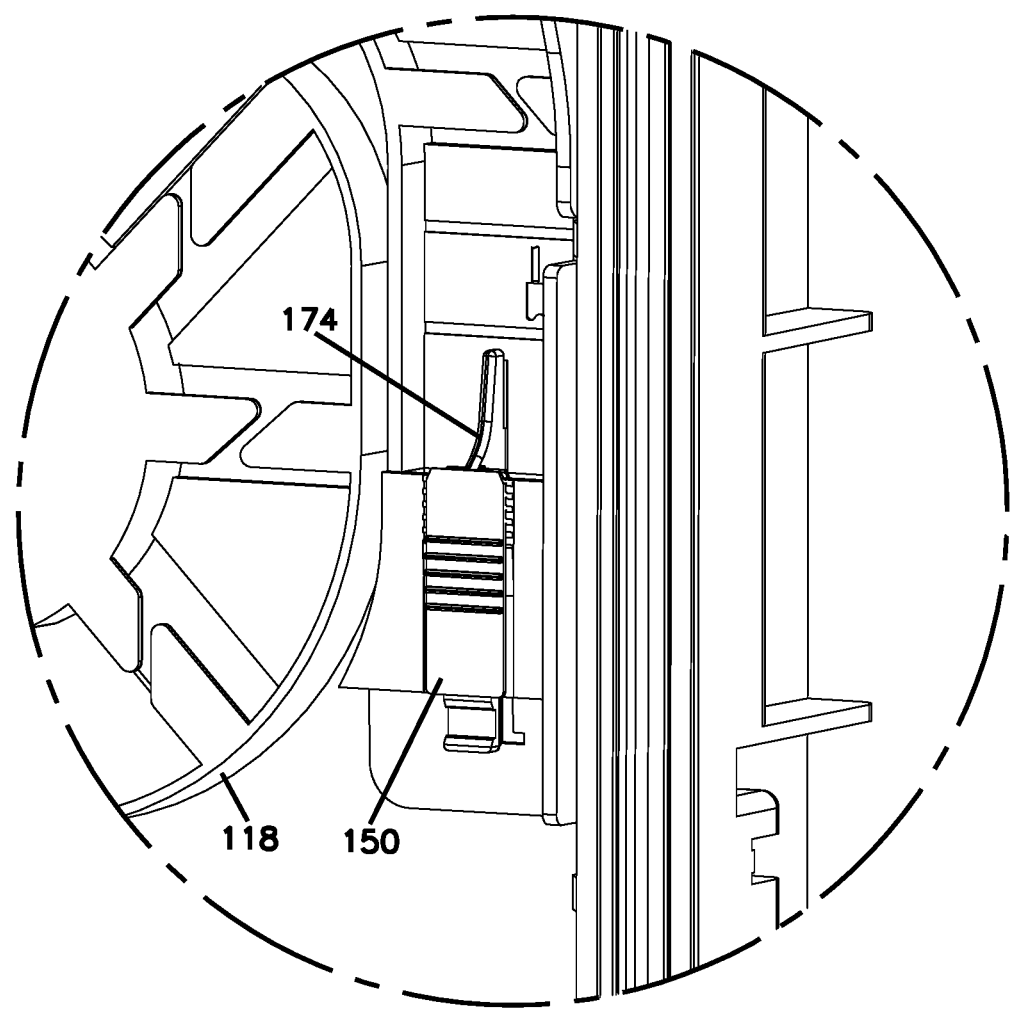

Furthermore, the interior 18 of the enclosure 10 may also define a pocket 120 underneath the storage tray 118 for storing the unused loop 122 of the feeder cable 14 coming into the enclosure 10 as will be discussed in further detail below (please see FIGS. 18 and 21).

According to an example arrangement for the enclosure 10, a feeder cable 14 that includes the fibers 12 carrying the input signals enters the enclosure through the input ports 16 defined at the base 38.

In some implementations, the input ports 16 may be defined solely by the base 38. In other implementations, as in the depicted example, the base 38 and the cover 40 may cooperate to define the input ports 16. In the example shown in FIGS. 1-32, the base 38 and the cover 40 each define a partial port opening that align to form the input ports 16 when the cover 40 is closed relative to the base 38.

In some implementations, the base 38 may include an anchoring region 124 at which the feeder cable 14 can be anchored. The anchoring region 124 houses the gel block 126 for the base 38 and is disposed under the splice region defined by the splice trays 116, which are located closer to the top 46 of the enclosure 10. The feeder cable 14 entering the enclosure 10 generally includes the feeder fiber 12, a jacket 128, and/or a strength layer 130 that can be attached to the base 38 at the anchoring region 124. As shown in FIG. 21, the jacket 128 of the feeder cable 14 may be attached to the anchoring region 124 via structures such as hose clamps 132. And, still referring to FIG. 21, after entering through an input port 16, the strength layer 130 of the feeder cable 14 may be anchored to the base 38 via a strain relief device 134. For further description relating to the strain relief device 134 and the method of using thereof, please refer to U.S. Patent Publication No. 2015/0093090 and International Publication No. WO2015/144397, the entire disclosures of which are incorporated herein by reference.

In certain implementations, the base 38 and the cover 40 both cooperate to activate the gel block 126 or other seal at the input ports 16. The gel block 126, as noted above, inhibits ingress of contaminants into the enclosure 10 through the input ports 16. In some implementations, the base 38 defines a sealing pocket 136 (e.g., at the anchoring region 124) in which the gel block 136 seats. In certain implementations, the cover 40 also can define a sealing pocket 136 aligned with the base sealing pocket 136. In certain examples, the cover 40 and base 38 compress two gel blocks 126 together when closed. The feeder cables 14 are routed between the gel blocks 126.

According to an example embodiment, the feeder cable 14 that enters the enclosure may carry a plurality of separate input tubes 138, each carrying a plurality of feeder input fibers 12. According to one embodiment, the feeder cable 14 may carry six fiber-protecting tubes 138. For processing, one of the tubes 138 may be separated from the rest for further processing. The tube 138 that is separated is trimmed and the feeder fibers 12 therein are exposed. The unused tubes 138 (e.g., five of the tubes 138 from the feeder cable 14) may be stored as a loop 122 in the pocket 120 underneath the storage tray 118. Please refer to FIG. 21 for an example of a feeder cable loop 122 that can be stored in the pocket 120 of the enclosure 10.

From the trimmed tube 138, one of the feeder fibers 12 is cut for further processing (e.g., splicing and splitting). The uncut feeder fibers 12 are lead to the storage tray 118 for fiber storage or future use. The uncut feeder fibers 12 (e.g., 250-micron) are stored within the storage tray 118 in an uncut loop.

For those feeder fibers 12 that are going to be stored in the storage tray 118, the uncut feeder fibers 12 follow the lowest of three passageways 140 that lead from a tube holding location 142 on the enclosure 10. The uncut feeder fibers 12, after being stored as a loop in the storage tray 118, leave the enclosure 10 through the same port 16 that the unused tubes 138 leave. Thus, the enclosure is used essentially for storing unused tubes 138 in a loop 122 in the pocket 120 below the storage tray 118 and also for storing unused, uncut feeder fibers 12 in a loop in the storage tray 118, before all of the unused tubes 138 and unused feeder fibers 12 are lead out of the feeder cable exit port 16 (or branch cable exit port if those tubes and fibers are from a branch cable 20 as opposed to a feeder cable 14) with feeder cable 14.

The feeder fiber 12 to be processed is routed to one of the splice trays 116 and is spliced to the module input fiber 13 that leads to one of the splitter modules 32 on the cover 40. The splice trays 116 enable the module input fibers 13 to be spliced to incoming feeder fibers 12.

If one feeder fiber 12 is to be processed, that feeder fiber 12 either leads to the middle splice tray 116 by following the middle of the three passageways 140 that lead from the tube holding location 142 or to the uppermost tray 116 by following the uppermost of the three passageways 140 that lead from the tube holding location 142.

Figure 17:
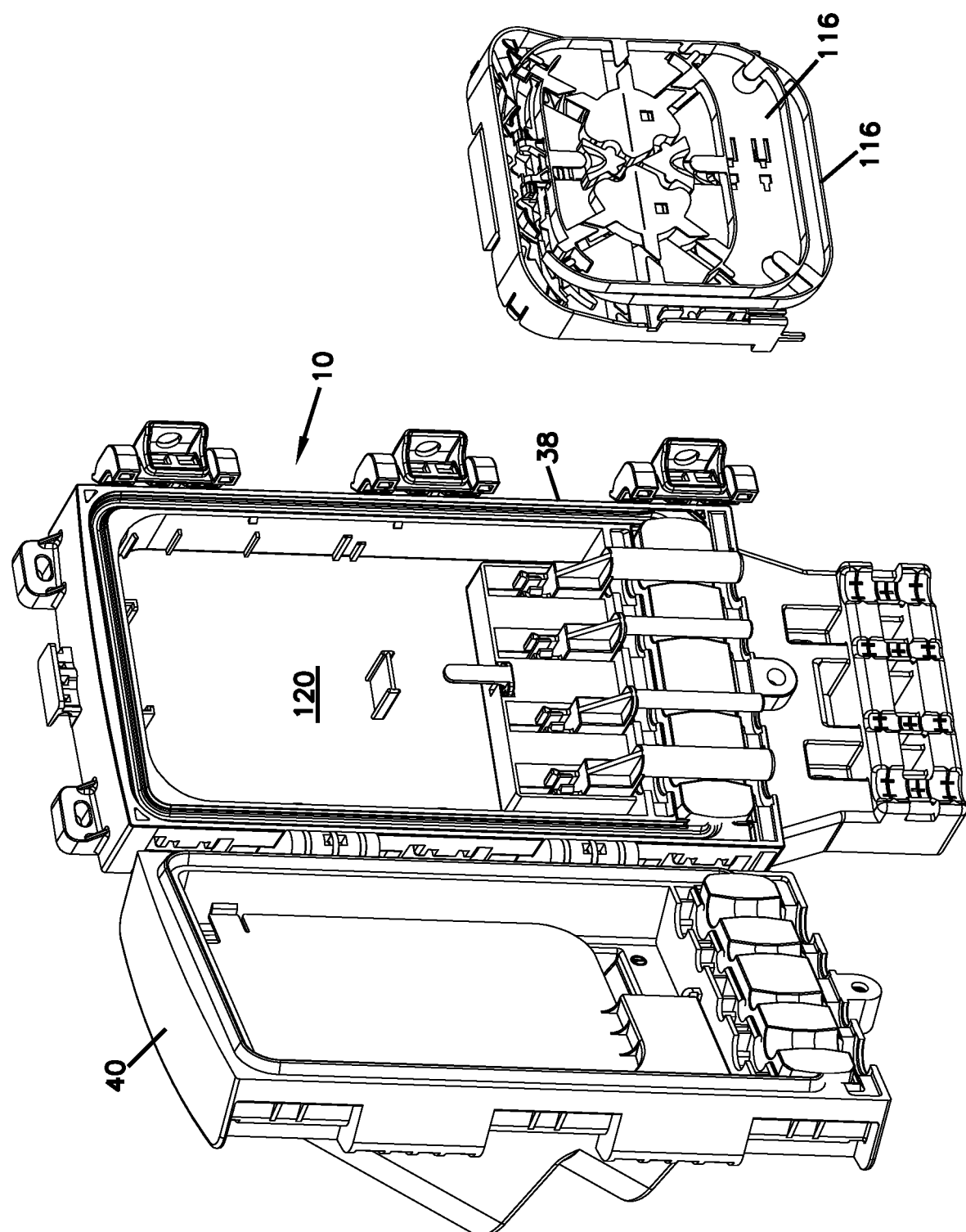
FIG. 17 illustrates the enclosure of FIG. 12 with the splice module in an exploded configuration.
Figure 19:
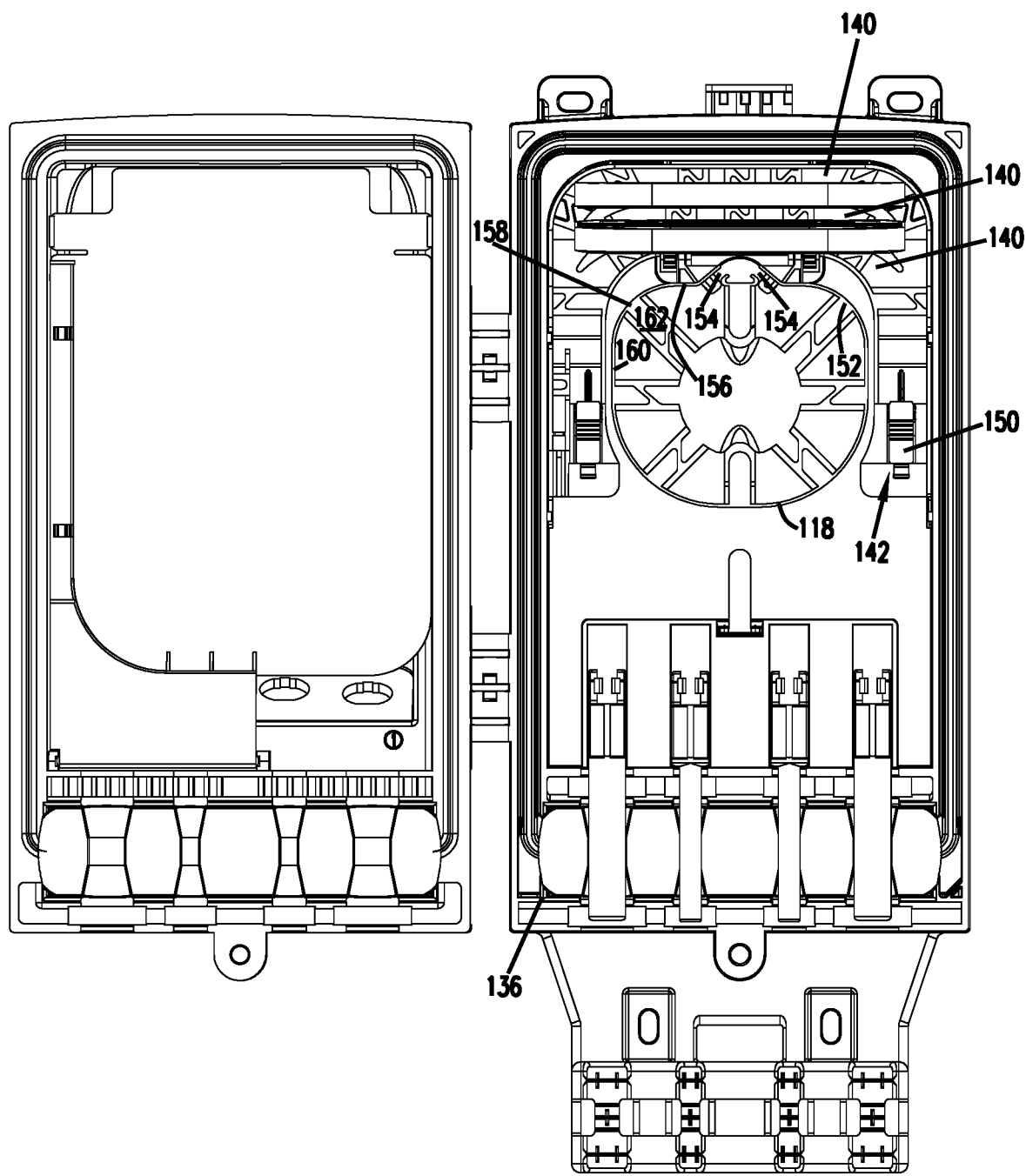
FIG. 19 illustrates the enclosure of FIG. 18 from a front view with the storage tray in the non-pivoted position.
Figure 20:
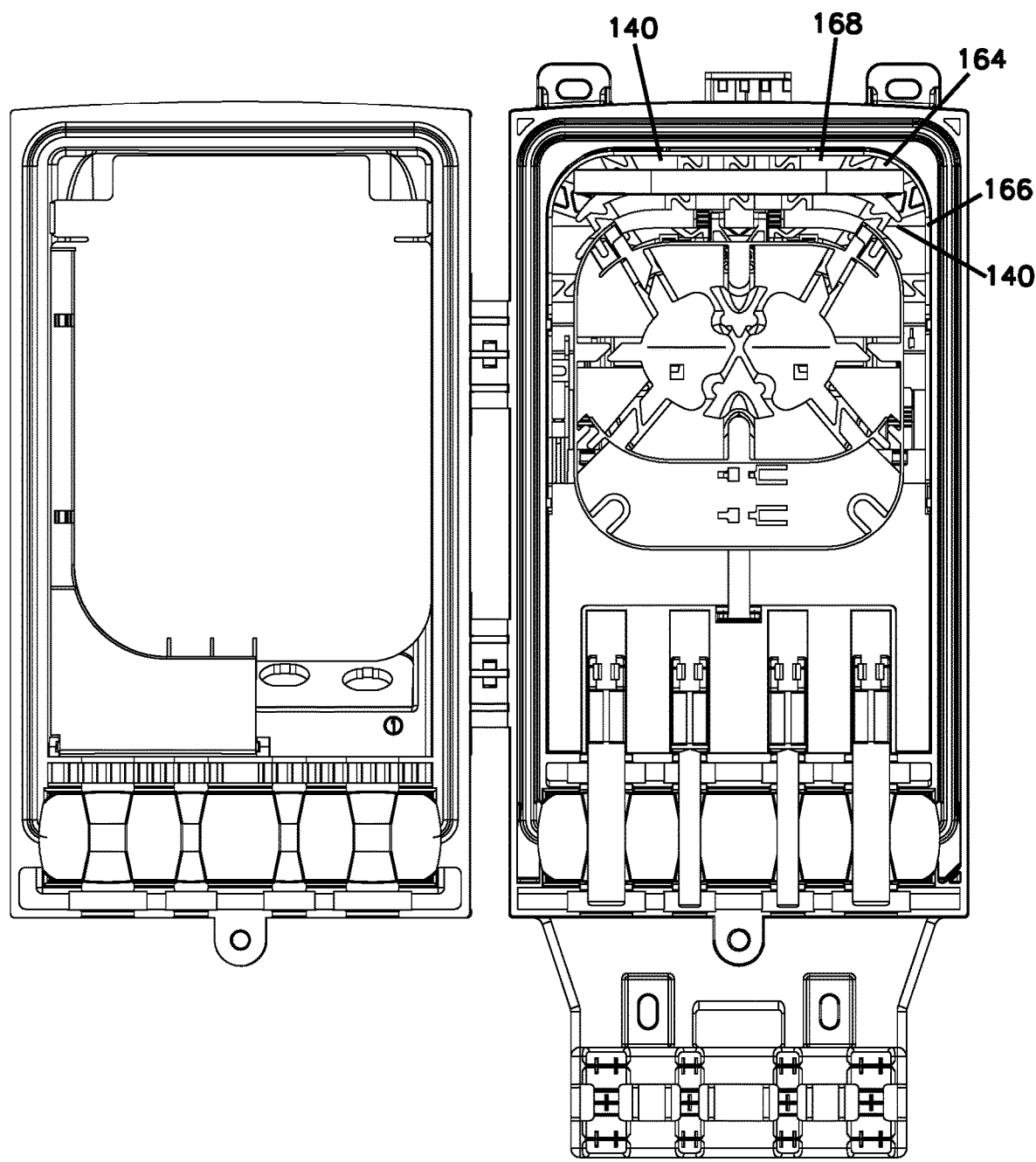
FIG. 20 illustrates the enclosure of FIG. 19 with one of the splice trays also in the non-pivoted position.

It should be noted that a feeder fiber 12 to be processed coming from the right side 50 of the enclosure 10 is lead through one of the passageways 140 and enters a splice tray 116 from the left upper side of the tray 116. That feeder fiber 12 is initially wrapped around a cable management spool 144 (and retained therein via cable management fingers 146) before being lead to a splice area 148, which is located underneath the cable management spool 144 as shown in FIGS. 17, 19, and 20.

Due to temperature variations, the tubes 138 carrying the feeder fibers 12 may expand or contract at a different rate than the feeder fibers 12. In certain instances, when the tubes 138 contract or shrink at a different rate than the feeder fibers 12, the feeder fibers 12 will experience a "grow-out" effect. The shrinking tubes 138 along the entire length of the feeder cable 14 will push the feeder fibers 12 further into the enclosure 10. For example, a 1% grow-out might mean that an extra 2-3 cm of 250-micron feeder fiber 12 needs to be accommodated. The extra "over-length" of feeder fiber 12 needs to be accommodated while still keeping the feeder fiber 12 organized/retained within enclosure 10. Parts of the enclosure 10 include features for accommodating such grow-out of the feeder fibers 12.

For example, as will be described in further detail below, a tube holder 150 that is located at the tube holding location 142 of the enclosure 10 allows the 250-micron fibers 12 that are protruding from the cut tube 138 to have more room in front of/above the tube holder 150. The tube holder 150 is made generally smaller so as to leave more room for the fiber 12 to grow forwardly before being lead to either the storage tray 118 or the splice trays 116. The smaller size tube holder 150 requires the tube 138 to be cut at a shorter length, exposing the feeder fibers 12 earlier into the enclosure 10. The smaller length of the tube 138 protruding into the enclosure 10 allows more room for the 250-micron feeder fiber 12 to grow out toward the storage/splice trays during temperature variations.

Another grow-out feature or zone may be seen in the storage tray 118, specifically in the upper right and left corners 152 of the storage tray 118.

For example, as the feeder fiber(s) 12 is entering the storage tray 118 after leading through the lowest of the three passageways 140 (e.g., going from the right side 50 toward the left side 52 of the enclosure 10), the feeder fiber 12 is routed into an angled input port 154 of the storage tray 118. When the feeder fiber 12 is routed into the storage tray 118 through the input port 154, the feeder fiber 12 generally lays adjacent the upper edge wall 156 of the angled input port 154 and is then lead directly into the tray 118. As shown in FIG. 19, just past the angled input port 154, the upper edge wall 156 of the storage tray 118 leads straight left and provides a curved transition 158 from the upper edge wall 156 to the left edge wall 160. The curved transition section 158 (i.e., the upper left corner 152 of the storage tray 118) borders a grow-out zone/area 162 where the fiber can expand if met with temperature variations. Where the feeder fiber 12 entering the storage tray 118 would follow the same angle as the input port 154 of the storage tray 118 under normal circumstances and lead directly toward the left edge wall 160 of the storage tray 118, if the feeder fiber 12 experiences a grow-out, the feeder fiber 12 can expand and be accommodated by the grow-out zone 162 bordered by the curved transition section 158 between the upper edge wall 156 and the left edge wall 160 (i.e., corner) of the storage tray 118. The "grow-out" corner 152 may be designed to accommodate 2-3 cm of fiber growth.

The three passageways 140 that lead from the tube holding location 142 to the different trays (e.g., the storage tray 118 and the splice trays 116) have also been designed with similar grow-out zones 164 in the form of expanded corners. For example, the transition from the right or left walls 166 of the passageways 140 to the upper wall 168 have been designed generally with a small radius (i.e., a sharp bend) for the feeder fiber(s) 12, preferably still meeting the minimum bend radius requirements of the feeder fiber(s) 12. However, in addition to the sharper bend, the upper corners have also been designed with grow-out zones 164. Thus, similar to the concept used in the entrance of the storage tray 118, the feeder fibers 12 are forced to take a sharper turn from the right and left walls 166 when they abut the upper walls 168 of the passageways 140, leaving a certain amount of space or grow-out zone 164 in the expanded corners. Thus, when the feeder fibers 12 experience a grow-out, the feeder fibers 12 have room to grow into these corners. The passageways 140 are made wide enough to accommodate the initial bend of the feeder fiber 12 and also any grow-out that might be experienced by the feeder fiber 12. The forced bend in combination with the curved expanded corner essentially allows room for the feeder fibers 12 to grow during temperature variations.

Figure 31:
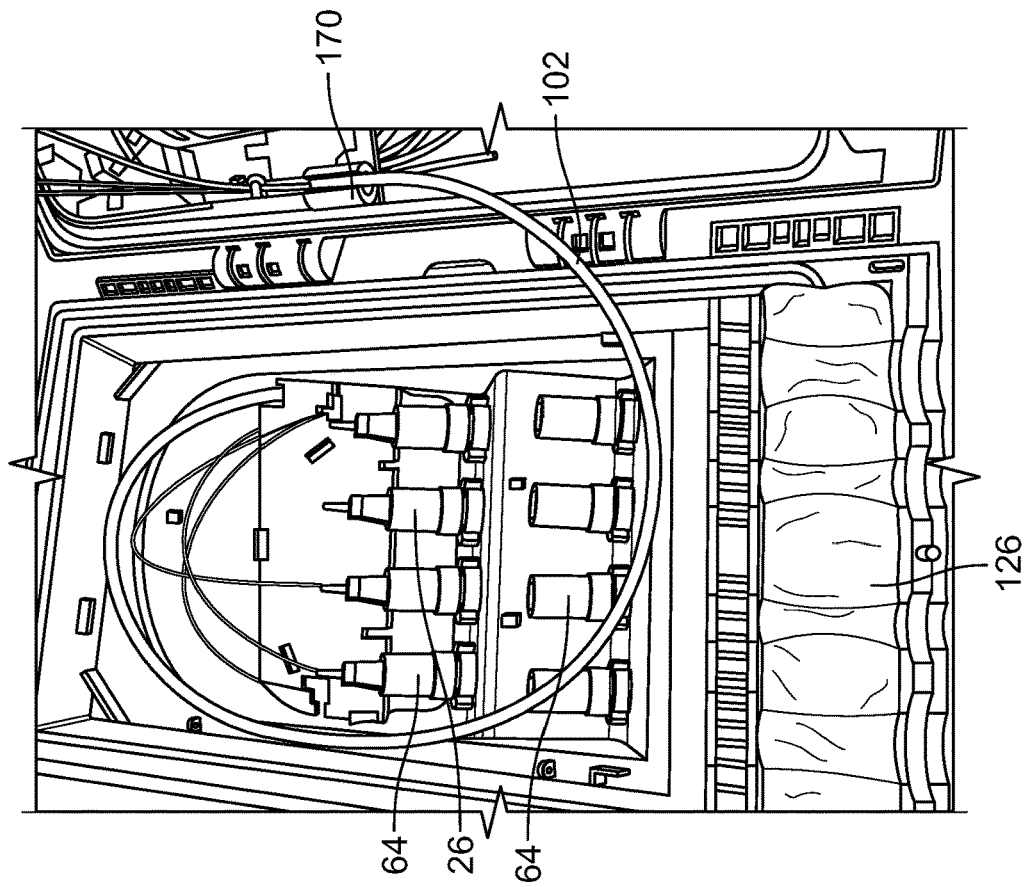
FIG. 31 illustrates an example cable routing configuration for the enclosure of FIGS. 1-20 showing input fibers surrounded by a tube extending from the splice trays of the base to the splitter modules of the cover and connectorized output pigtails extending from the splitter modules to the ruggedized fiber optic adapters of the cover.

Now referring to FIGS. 31-32, after the splicing operation in the splice trays 116, the module input fiber 13 that leads from the splice tray 116 to the splitter module 32 is protected by a tube 102, as discussed above, that crosses over the hinge of the enclosure 10. The tube 102 is secured/anchored to an output 170 of the splice tray 116 (please see FIG. 31) and is secured to an input 96 of the splitter module 32 (please see FIGS. 31, 32, 34, and 35).

In the depicted embodiment, two splice trays 116 are shown for the enclosure 10. As such, two of the feeder fibers 12 from the feeder cable 14 can be spliced at each of the splice trays 116 to the module input fibers 13 that lead to the splitter modules 32. For example, since the enclosure 10 has eight output ports 24 (four per row), each module input fiber 13 may be split by a 1×4 splitter 34 in each of the two splitter modules 32, and the splitter outputs which are provided as connectorized pigtails 28 may populate the eight output ports 24.

According to another example arrangement, if a feeder fiber 12 is being processed at the same time as a branch cable fiber, the branch cable fiber may be kept separate from the feeder fiber 12 and lead to a different splice tray 116 from that of the splice tray 116 that receives the feeder fiber 12. From the splice trays 116, the branch cable fiber and the feeder fiber 12 may lead to separate splitter modules 32 for the splitting operation and exit the enclosure.

Referring now to FIGS. 22-30, the tube holder 150 is used when routing the feeder cable tube 138 into the enclosure 10, further details of which are described below. And, when a feeder cable 14 is entering the enclosure 10 at the same time as a branch cable 20, the tube holder 150 is useful in keeping the tubes 138 from the different cables 14, 20 separate, as will be described below.

Still referring to FIGS. 22-30, the tube holder 150 of the enclosure 10 is shown in closer detail. The tube holder 150 is slidably mounted to a tube holding location 142 of the base 38 of the enclosure 10. The tube holder 150 defines a mounting portion 172 and a divider portion 174. The divider portion 174 extends away from the mounting portion 172 and is configured to divide the tube holding location 142 of the enclosure 10 into two separate channels 176 for keeping two cables separate (e.g., a tube of the feeder cable 14 and a tube of the branch cable 20).

The mounting portion 172 is defined by the combination of a dovetail structure 178 that protrudes from the divider portion 174 and a latch structure 180 that is positioned at an opposite side of the divider portion 174 from the dovetail structure 178. The dovetail structure 178 is used in slidably moving the tube holder 150 within a track 182 defined at the splice region of the base 38. The dovetail structure 178 defines a tab 184 underneath thereof (please see FIG. 23) that is used for initially inserting the tube holder 150 into the track 182. When inserting, the tube holder 150 is tilted generally perpendicular to the track 182, and the dovetail structure 178 including the tab 184 are inserted into a T-shaped keyhole 186 defined at the bottom of the track 182. The tube holder 150 is then tilted to a parallel position to the track 182 and is able to be slid along the track 182, with the tab 184 preventing the removal of the tube holder 150 from the track 182 (without retilting it to a perpendicular position).

Figure 28:
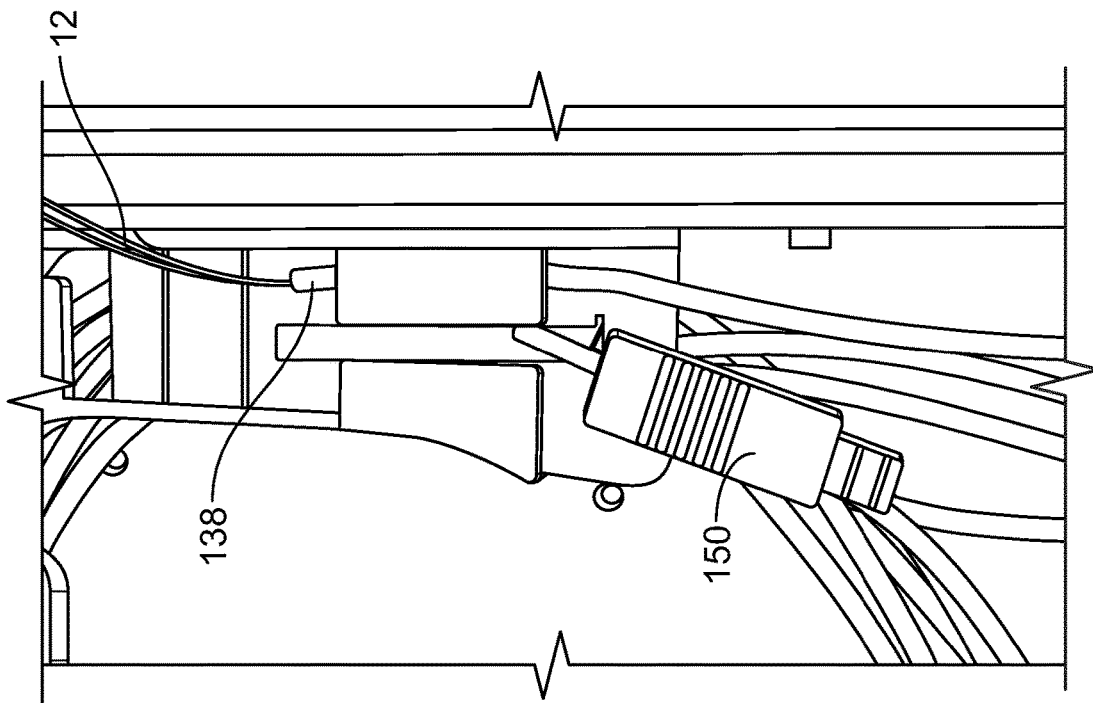
FIG. 28 illustrates the tube of the feeder cable of FIG. 27 placed within the tube holding location.
Figure 27:
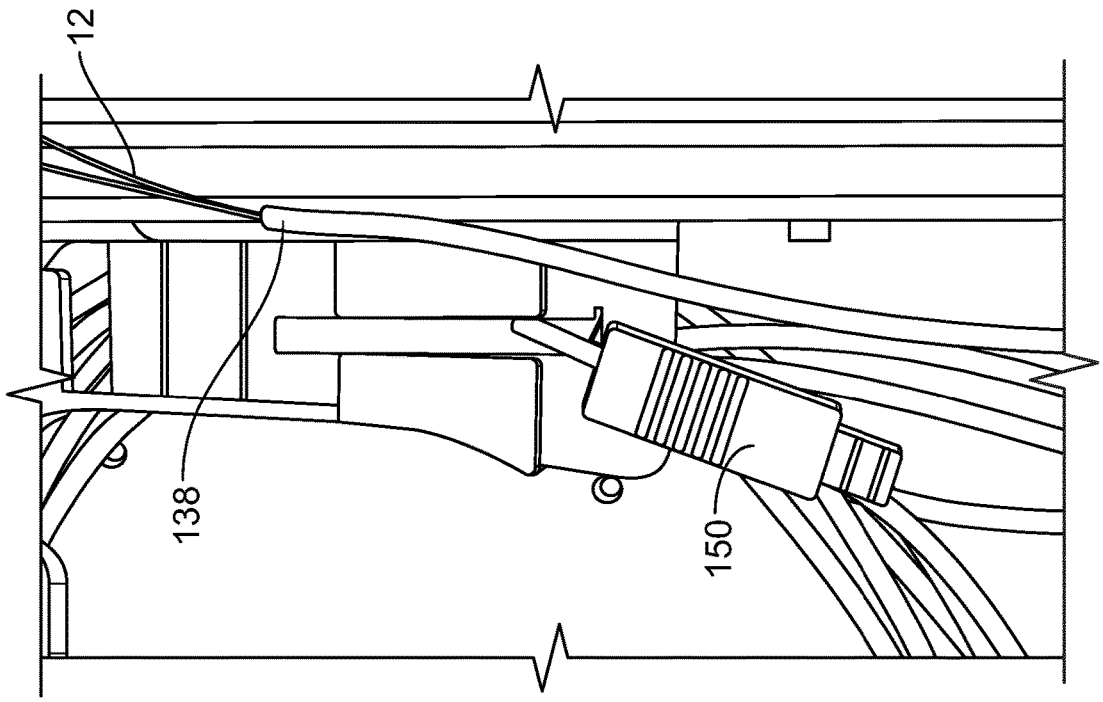
FIG. 27 illustrates the tube holder of the enclosure in a slid-back/access position to allow one of the tubes of a feeder cable to be secured to the enclosure for further processing of the fibers therein.
Figure 30:
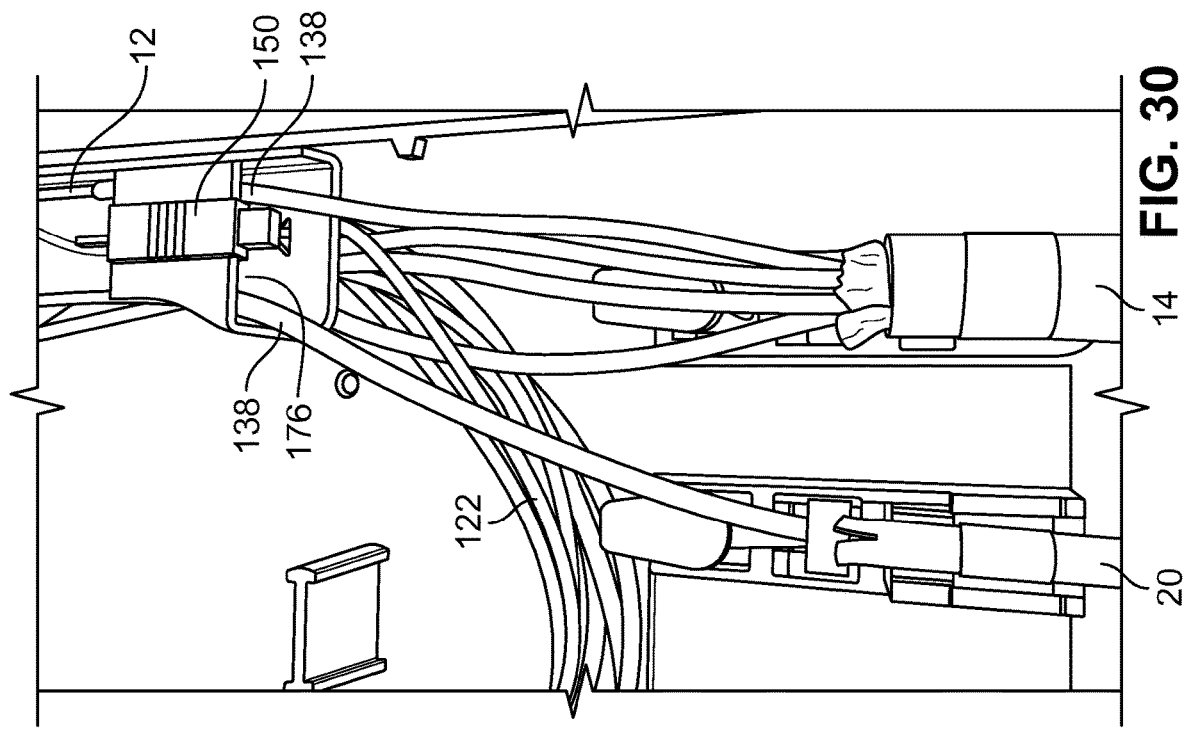
FIG. 30 is a close-up view of the tube holder of FIG. 29 showing the tube holder separating the tube of the feeder cable and the tube of the branch cable.
Figure 29:
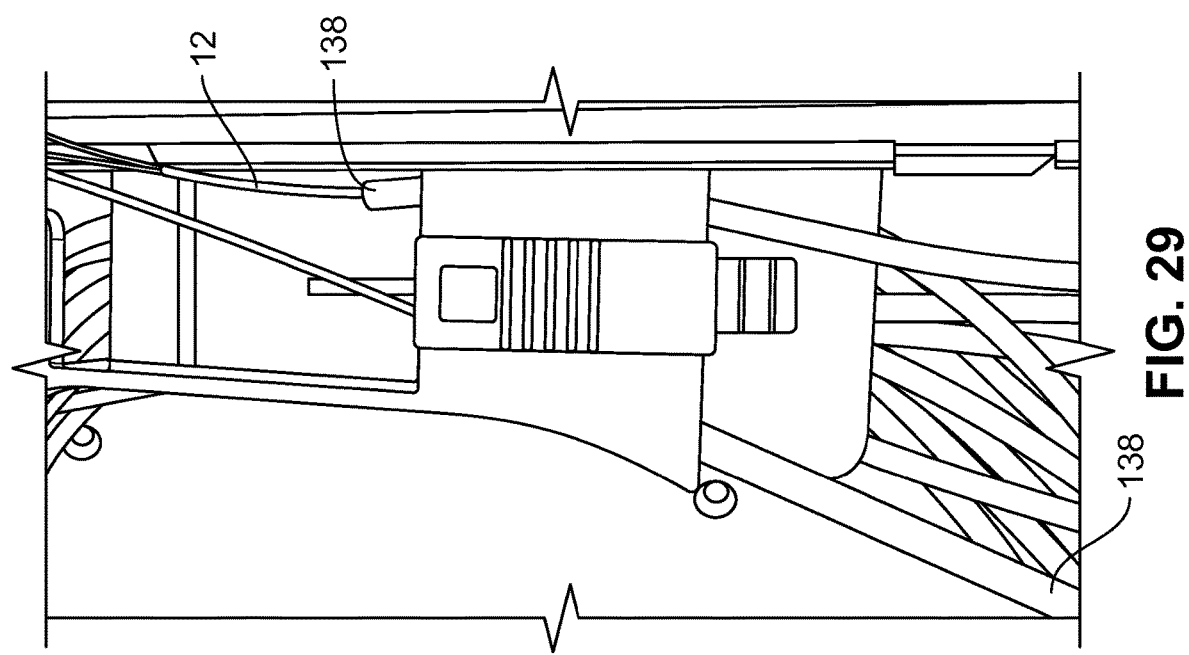
FIG. 29 illustrates the tube holder of FIGS. 27-28 in a closed position with a tube of the feeder cable and a tube of a branch cable separated by the tube holder.

The latch structure 180 is defined by a pair of opposing parallel walls 188 on both sides of the divider 174. The parallel walls 188 define a slot 190 therein between for receiving edges 192 defined by the tube holding location 142. The tube holder 150 rides along the two edges 192 defined by the tube holding location 142 as the tube holder 150 is slidably moved. The latch structure 180 defines latching ribs 194 that mate with ribs 196 defined on the edges 192 for slidably locking the tube holder 150 into place. The edges 192 define a tapered profile that provides a locking feature for the tube holder 150. The latch structure 180 of the tube holder 150 is elastically deflected as the ribs 194 thereof mate with the ribs 196 defined on the edges 192 in locking the tube holder 150 into place. FIGS. 22-26 illustrate the steps in slidably mounting the tube holder 150 to the base 38 of the enclosure 10 for securing the tubes 138 of feeder or branch cables to the enclosure 10. FIG. 27 illustrates the tube holder 150 of the enclosure 10 in a slid-back/access position to allow one of the tubes 138 of a feeder cable 14 to be secured to the enclosure 10 for further processing of the feeder fibers 12 therein. FIG. 28 illustrates the tube 138 of the feeder cable 14 placed within the tube holding location 142. FIG. 29 illustrates the tube holder 150 in a closed position with a tube of the feeder cable 14 and a tube of a branch cable 20 separated by the tube holder 150. FIG. 30 is a close-up view of the tube holder 150, showing the tube holder 150 separating the tube of the feeder cable 14 and the tube of the branch cable 20.

In summary, in the depicted example of the enclosure 10, to connect the feeder fiber 12 to the drop fibers exiting the enclosure, the feeder cable 14 is first routed into the enclosure 10 through one of the input ports 16. One of the feeder fibers 12 is routed from a terminated end of the feeder cable 14 to one of the splice trays 116 carried by the base 38. As noted above, a cable jacket 128 and/or strength member 130 of the feeder cable 14 can be anchored to the base 38 of the enclosure 10. A splitter module 32 can be located at an inner side of the cover 40 of the enclosure 10. Connectorized ends of the output pigtails 28 of the splitter module 32 are plugged into inner ports 64 of optical adapters 26 carried by the cover 40.

When looking in the reverse direction, an unconnectorized end of the module input fiber 13 is routed from the cover 40 to one of the splice trays 116 at the base 38. The unconnectorized end of the module input fiber 13 is then spliced to the end of the feeder fiber 12 and the splice is stored at the splice tray 116. Then, a connection is finally established between the feeder fibers 12 coming from an exterior of the enclosure 10 by plugging connectorized ends of the drop fibers into the outer ports 66 of the optical adapters 26.

As discussed previously, the unused tubes 138 from the feeder cable 14 are stored in a loop 122 within a storage pocket 120 underneath the storage tray 118. And, the unused feeder fibers 12 from the selected tube 138 are stored in a looped configuration within the storage tray 118.

Also, as discussed previously, even though the modular elements within the enclosure 10 have been discussed as modules that house optical elements in the form of splitters 34, in other embodiments, the modules 32 may provide straight-through cable routing. In such an arrangement, as shown in FIGS. 33-35, all of the feeder fibers 12 from a feeder cable tube 138 may be spliced at a splice tray 116 to connectorized pigtails 28, which are then routed to a module 32 and managed within the module 32 before leading to the adapters 26 on the cover 40 of the enclosure 10.

Thus, the enclosure 10 is designed to provide a number of alternative connectivity solutions depending on the needs of the network.

Referring now to FIGS. 36-43, a module 200 according to one embodiment of the present disclosure is shown. The module 200 shares many features with the module 32 above. Similar to the module 32 described above, the enclosure 10 may removably house a singular module 200, or multiple modules 200. In some embodiments, the module 200 can house optical elements within a housing 202 in the form of splitters, or, in other embodiments, the module 200 may provide straight-through cable routing. The module 200 may be configured to receive at least one module input fiber 13 in a tube 204 (continuing the same signal as the feeder fiber 12) and output a single or a plurality of connectorized pigtails 206. Each output pigtail 206 may have a connectorized end that can be configured to exit the example enclosure 10 via the ruggedized adapters 26 as noted above. In some embodiments, the connectorized pigtails 206 utilize SC connectors. When not in use, the connectorized pigtails 206 can be stored on the module housing 202. By storing the connectorized pigtails 206, the interior of the enclosure 10 becomes more organized, thereby easing installation and maintenance. Further, when storing output pigtails 206 on the module 200, it eases installation as the connectorized pigtails 206 are out of the way of the installer.

Some embodiments of the present invention include a service connection method to connect a subscriber into service by first disconnecting an individual splitter output pigtail 206 from the storage position on module 200 and then routing the pigtail to the desired ruggedized adapters 26. Other embodiments include a method of removing an output pigtail 206 from ruggedized adapters 26 and either redeploying that output pigtail 206 to new ruggedized adapters 26 or storing the output pigtail 206 to the original storage position at the module 200.

The module housing 202 defines a first major surface 208 connected to a second major surface 210 by a circumferential edge 212. The module housing 202 defines an interior between the major surfaces 208, 210. The module 200 can include an input opening 214 on the housing 202 that is configured with an anchor (not shown), similar to anchor 100 described above, for securing the tube 204 carrying the module input fiber or fibers 13. The input opening 214 provides access into the interior of the module housing 202.

Like the module 32, the module 200 may include a mounting arrangement that aids in securing the module 200 within the pockets 72 defined by the cover 40 of enclosure 10 of the present disclosure. The mounting arrangement may include catches 216 that extend outwardly from the module housing 202 to mate with structures in each pocket 72 of the enclosure 10.

Figure 36:
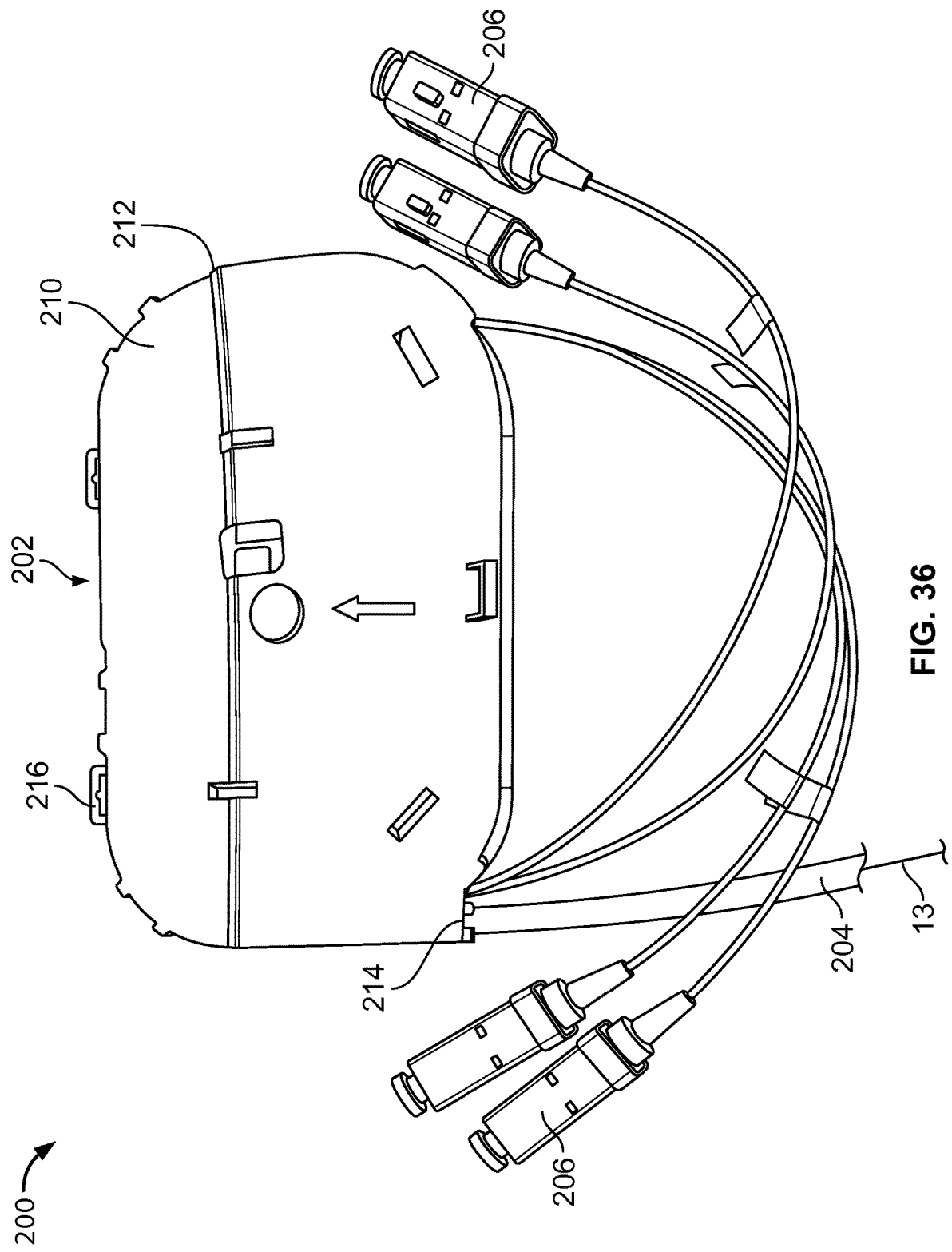
FIG. 36 illustrates a perspective view of a module similar to the modules usable in the enclosure of FIGS. 1-20, according to one embodiment of the present disclosure.
Figure 37:
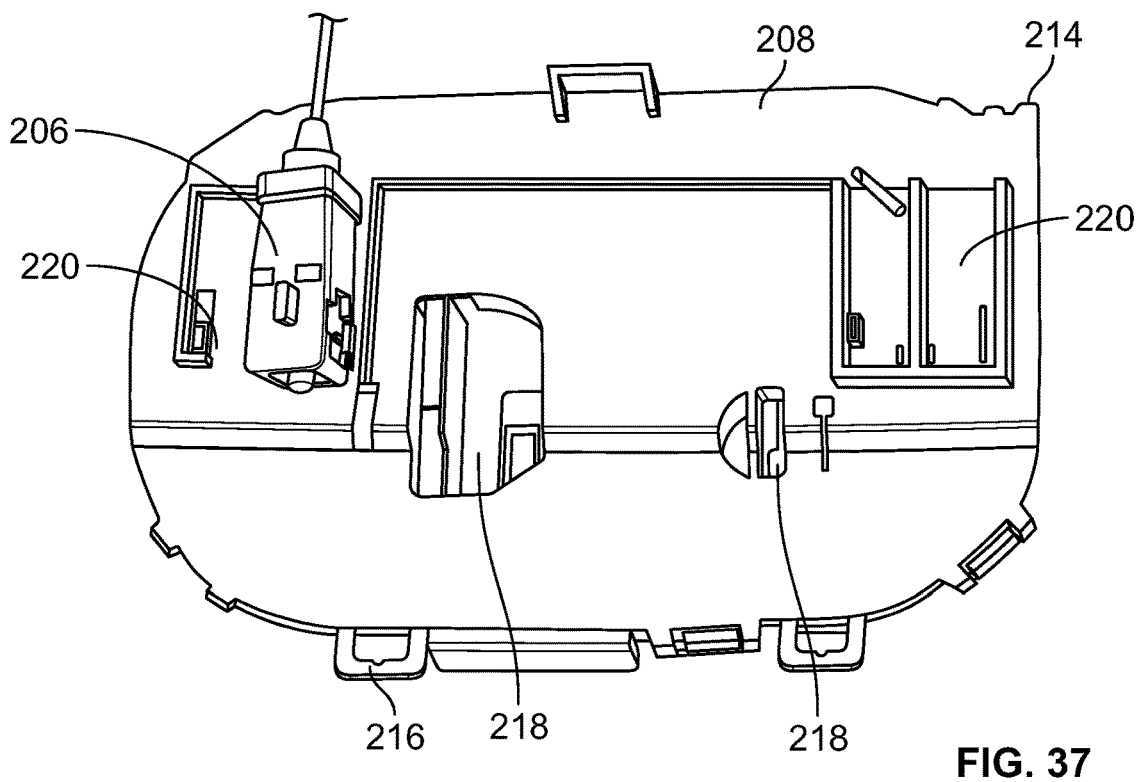
FIG. 37 is a perspective view of a first major surface of the module of FIG. 36.
Figure 38:
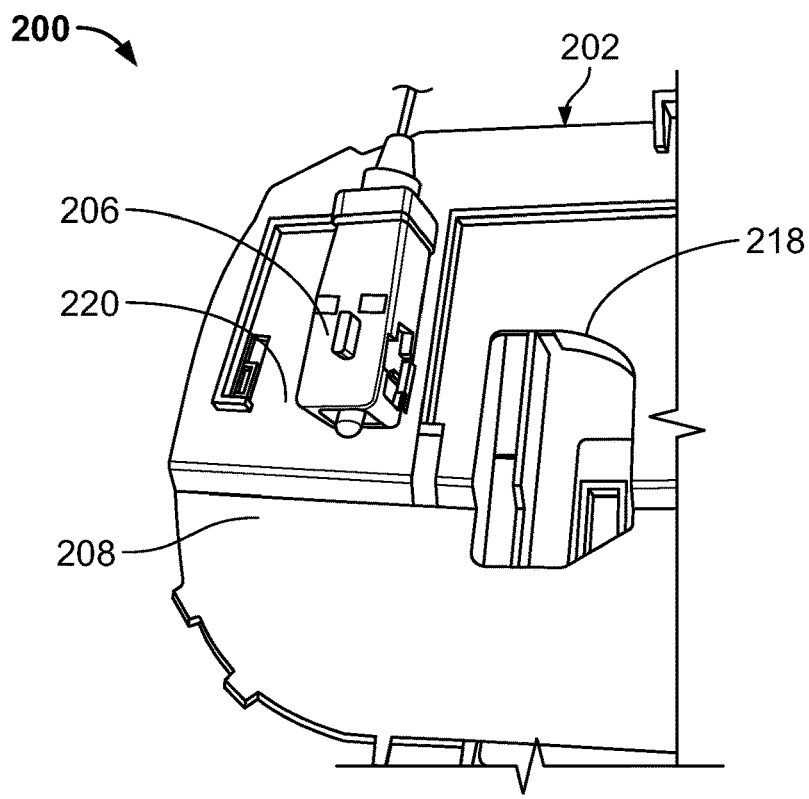
FIG. 38 is a close up view of connector storage of the module of FIG. 36.
Figure 39:
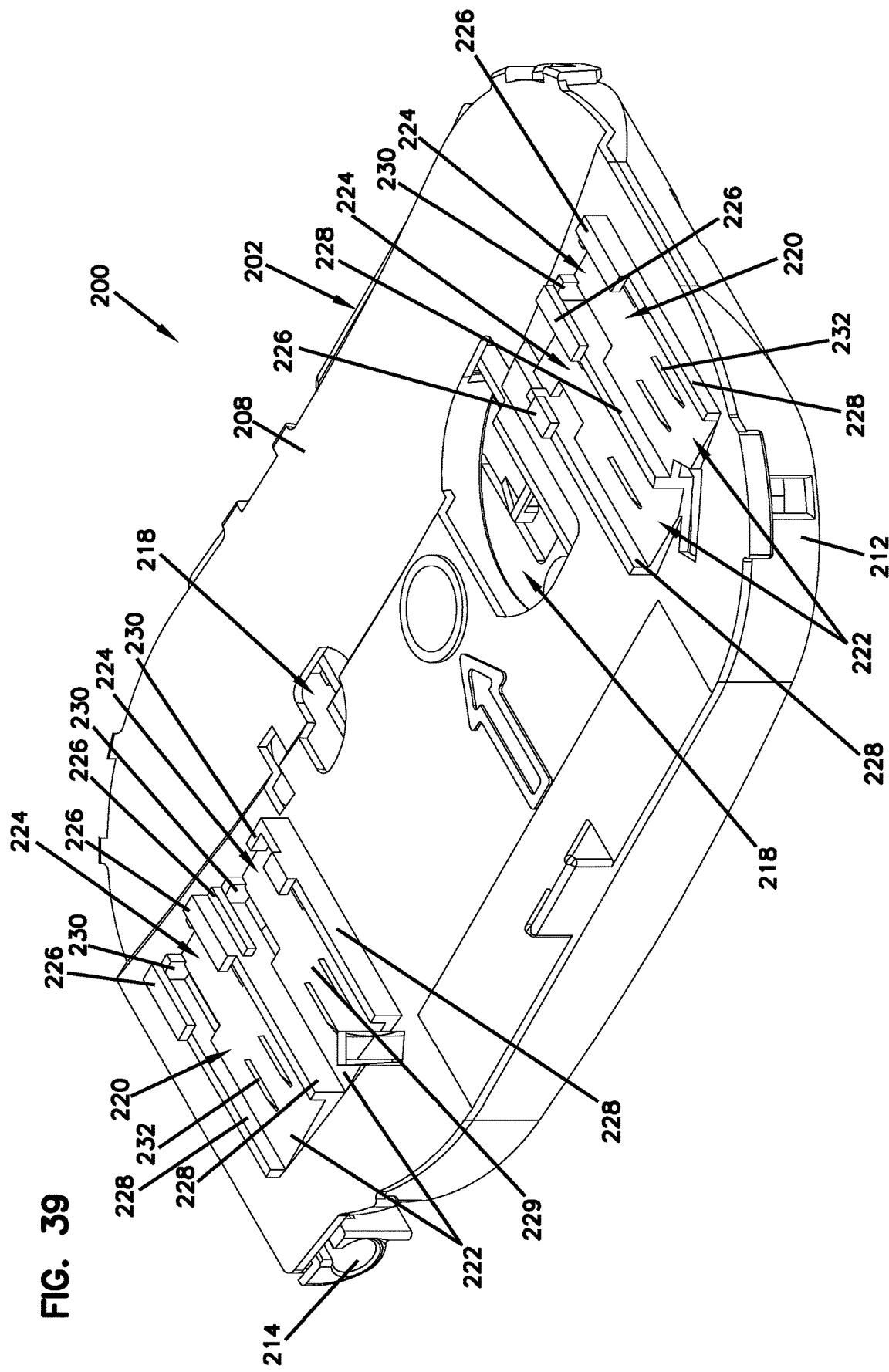
FIG. 39-40 illustrates top perspective views of the housing of the module of FIG. 36.
Figure 40:
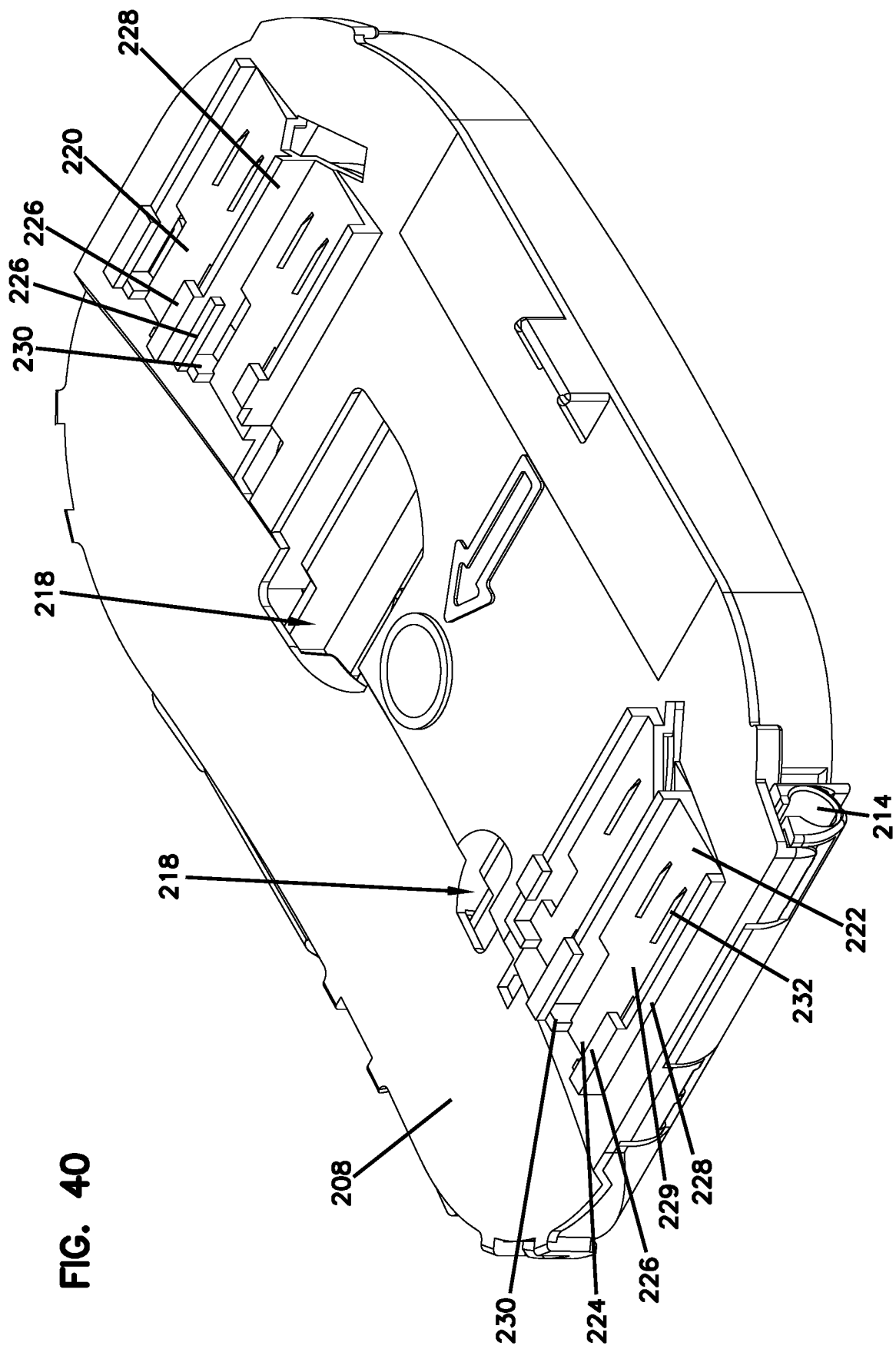
Figure 41:
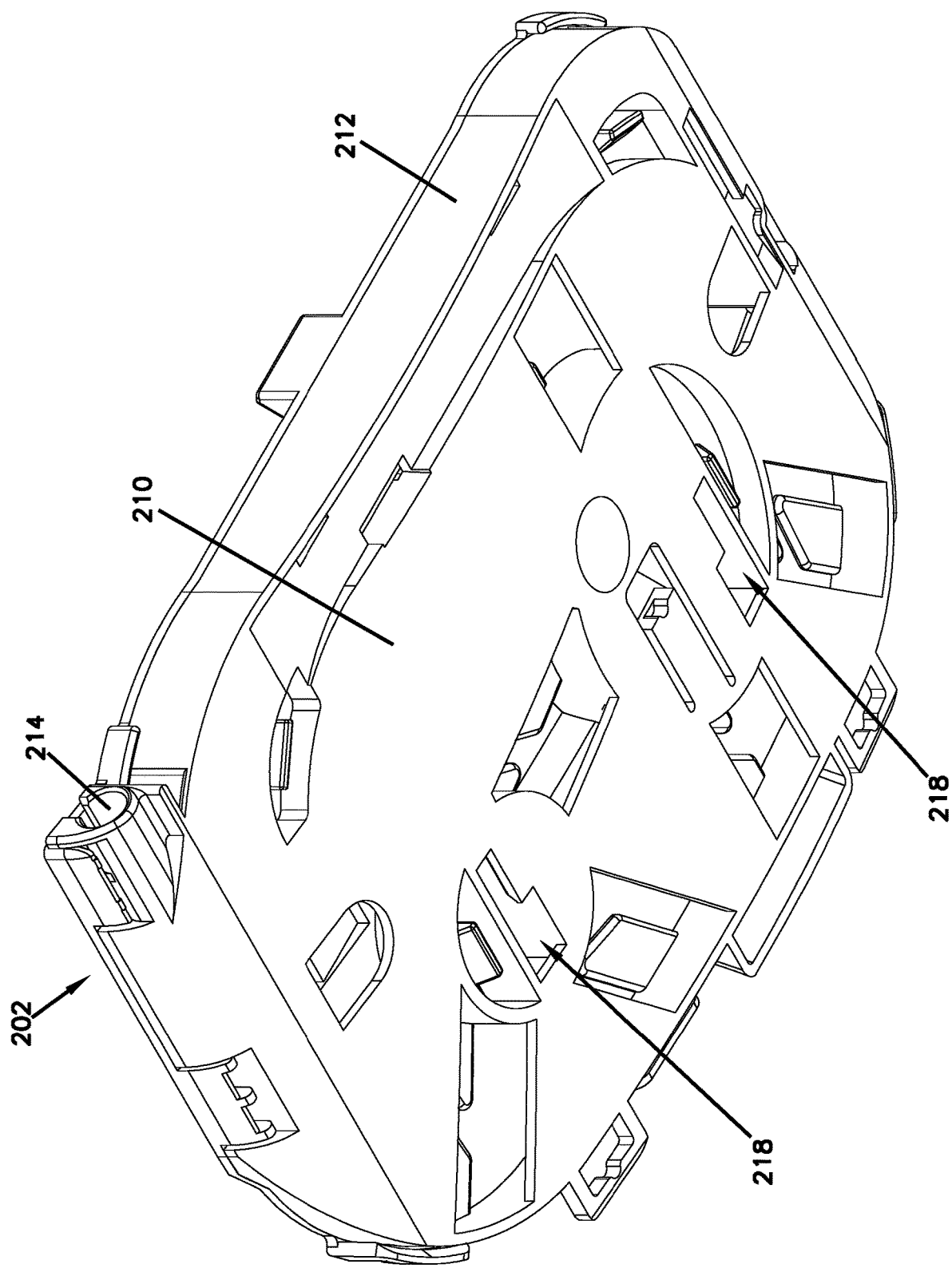
FIG. 41 illustrates a bottom perspective view of the housing of the module of FIG. 36.
Figure 42:
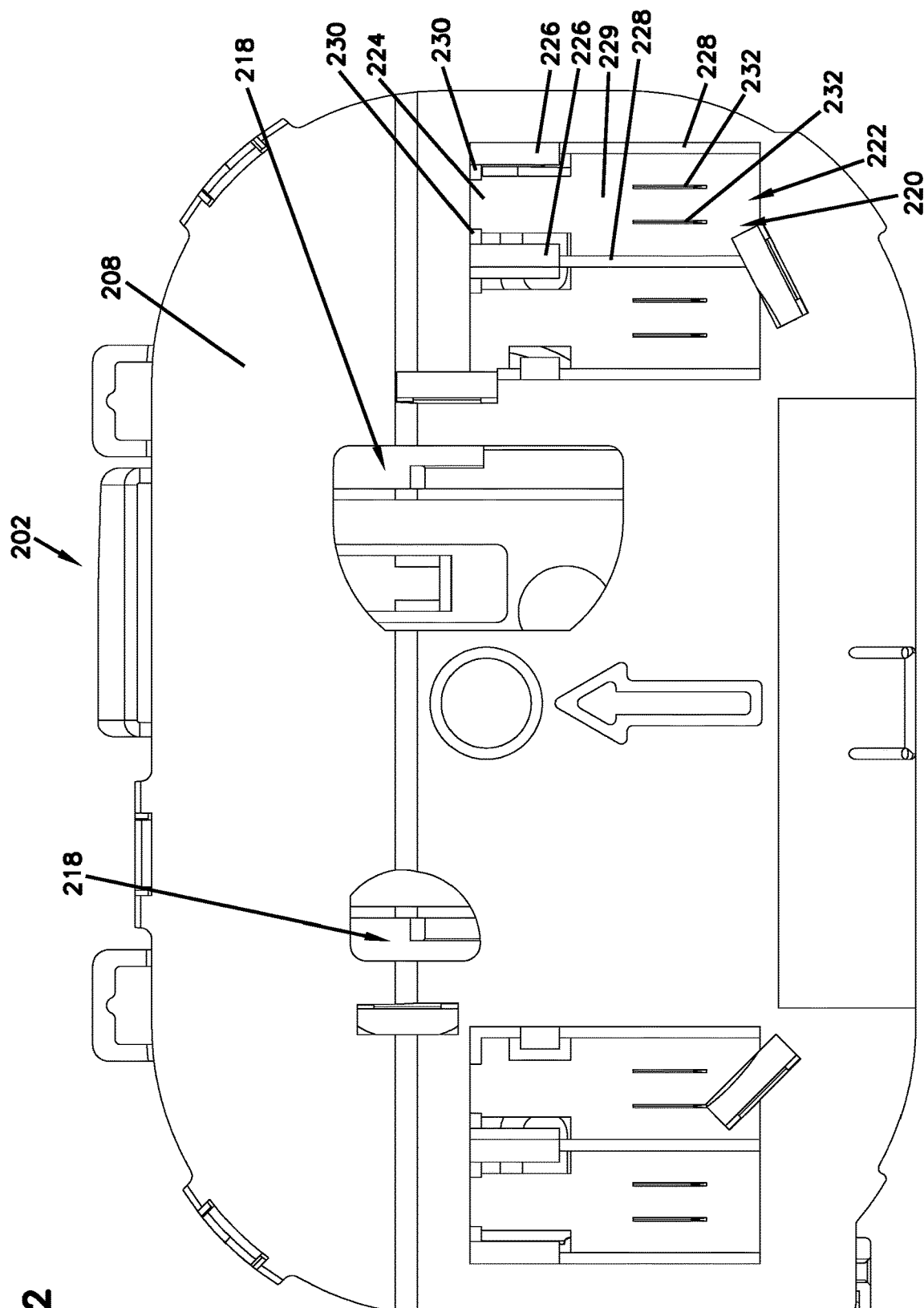
FIG. 42 illustrates a top view of the housing of the module of FIG. 36.
Figure 43:
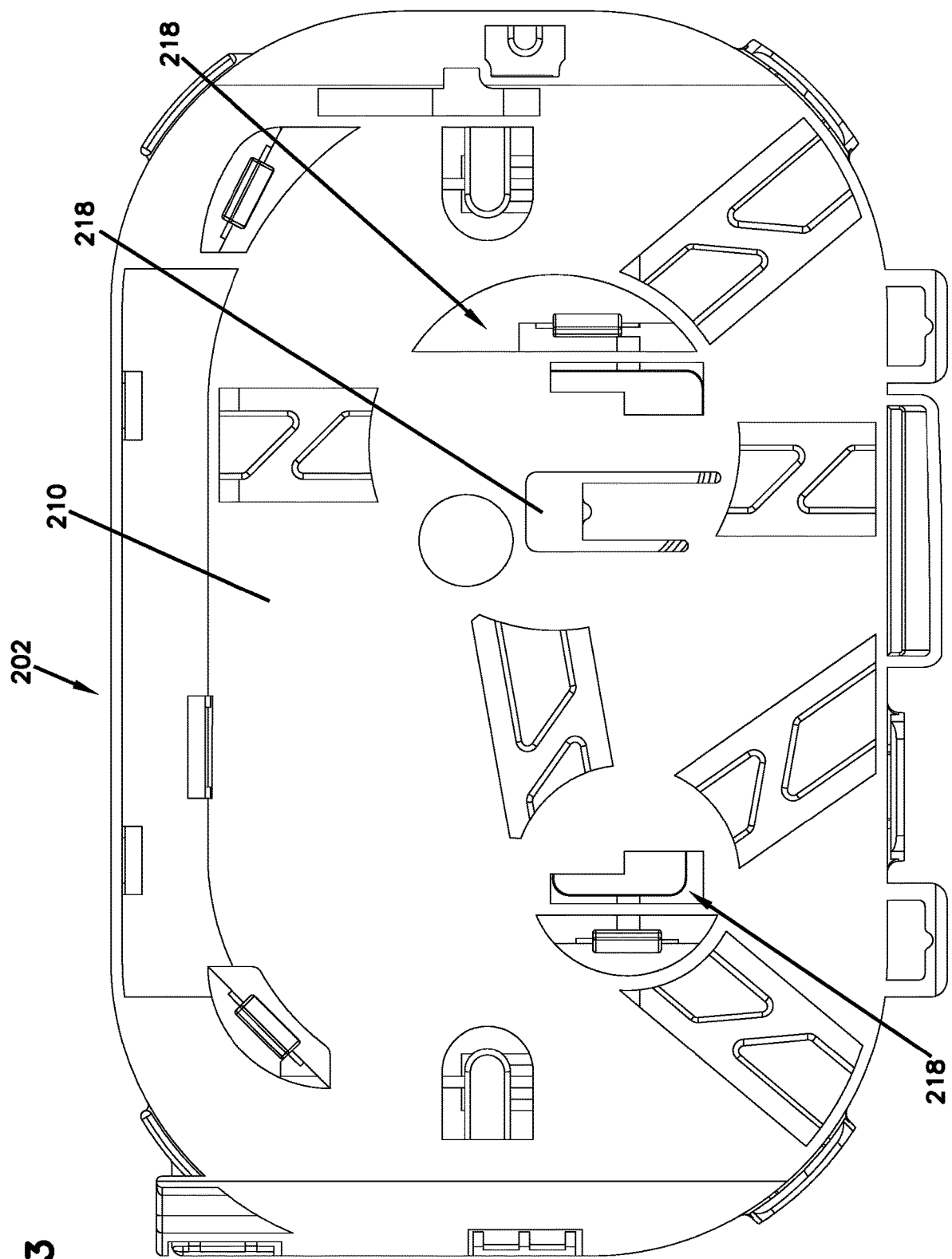
FIG. 43 illustrates a bottom view of the housing of the module of FIG. 36.

The first major surface 208 includes a pair of windows 218 and a plurality of connector storage slots 220. The windows 218 allow the installer to peer through the first major surface 208 into the interior and to the second major surface 210 of the module 200. In some embodiments, the windows 218 allow the installer to gain a visual of at least a portion of the mounting arrangement that aids in securing the module 200 within the pockets 72 defined by the cover 40 of enclosure 10. Further, as shown in FIGS. 36-38, a connectorized pigtail 206 is shown positioned within one of the connector storage slots 220.

FIGS. 39-43 show the housing 202 of the module 200. Specifically, the connector storage slots 220 are shown to each include a first end 222, a second end 224, a pair of retention tabs 226, a pair of side walls 228, and at least a partial end wall 230. Each slot 220 is configured to receive the connectorized pigtail 206 at the first end 222 and hold the connectorized pigtail 206 within the slot 220 until the installer manually removes the connectorized pigtail 206. When inserted into the slot 220 at the first end 222, the connectorized pigtail 206 slides between the side walls 228 on a flat bottom surface 229 of the slot 220. The side walls 228 are spaced at a width that is slightly larger than the width of the connectorized pigtail 206. The side walls 228 thereby help to retain the connectorized pigtail 206 within the slot 220 and prevent the connectorized pigtail 206 from sliding around on the first major surface 208 when the connectorized pigtail 206 is positioned within the slot 220. As the connectorized pigtail 206 slides within the slot 220 between the side walls 228, the connectorized pigtail 206 encounters the retention tabs 226 at the second end 224 of the slot 220.

The retention tabs 226 are configured to interface with features of the connectorized pigtail 206. In some embodiments, when the connectorized pigtail 206 uses an SC connector, the retention tabs 226 interface with ramped recesses on the connector (not shown). Once the connectorized pigtail 206 interfaces with the retention tabs 226 of the slot 220, the retention tabs 226 prevent the connectorized pigtail 206 from moving in a direction away from the first major surface 208. In other embodiments, the retention tabs 226 can be configured to interface with a top surface of the connectorized pigtail 206.

After the retention tabs 226 have interfaced with the connectorized pigtail 206, the connectorized pigtail 206 reaches the end wall 230 at the second end 224. The end wall 230 prevents the installer from pushing the connectorized pigtail 206 too far into the slot 220. The end wall 230 also ensures that the retention tabs 226 are properly positioned on the connectorized pigtail 206. In the depicted embodiment, the end wall 230 is a partial end wall 230 that covers only a portion of the second end 224 of the slot 220. In other embodiments, the end wall 230 may span the entire width of second end 224 of the slot 220.

In the depicted embodiment, the slots 220 also each include friction reducing rails 232 disposed at the bottom surface 229 of the slot 220. The rails 232 can be an optional feature of the slot 220. The rails 232 provide a surface for the connectorized pigtail 206 to slide on when being inserted and removed from the slot 220. The rails 232 can reduce the friction between the slot 220 and the connectorized pigtail 206, making sliding the connectorized pigtail 206 within the slot 220 easier.

As shown, four connector storage slots 220 are disposed on the first major surface 208 of the module 200. However, in some embodiments, additional or less connector storage slots 220 can be positioned on the first major surface 208.

The above specification, examples and data provide a complete description of the manufacture and use of the composition of the disclosure. Since many embodiments of the disclosure can be made without departing from the spirit and scope of the disclosure, the inventive features reside in the claims hereinafter appended.

LIST OF REFERENCE NUMERALS AND CORRESPONDING FEATURES

10 Enclosure
12 Feeder/input fiber
13 Module input fiber
14 Feeder cable
16 Input port
18 Interior of enclosure
20 Branch cable
22 Output of enclosure
24 Output port of enclosure
26 Optical adapter
28 Connectorized pigtail
30 Optical device
32 Splitter module
34 Fiber optic splitter
36 Splitter module housing
38 Base
40 Cover
42 Front of enclosure
44 Rear of enclosure
46 Top of enclosure
48 Bottom of enclosure
50 Right side of enclosure
52 Left side of enclosure
54 Mounting flange
56 Fastener opening
58 Enclosure gasket
60 Hinge member 62 Clasp arrangement
64 Inner port of adapter
66 Outer port of adapter
68 Adapter mounting surface
70 Module mounting surface
72 Pocket
74 Cover of splitter module
76 First major surface
78 Second major surface
80 Circumferential edge
82 Interior of splitter module
84 First part
86 Second part
88 Latching tab
90 Recess
92 Optical device mounting region
94 Fiber routing region
96 Fiber input opening
98 Outlet opening
100 Anchor
102 Tube
104 Cable management tab
106 Large spool
108 Small spool
110 Catch
112 Protection cover
114 Tab
116 Splice tray
118 Storage tray
120 Pocket
122 Loop
124 Anchoring region
126 Gel block
128 Jacket
130 Strength member
132 Hose clamp
134 Strain relief device
136 Sealing pocket
138 Input tube
140 Passageway
142 Tube holding location
144 Cable management spool
146 Cable management finger
148 Splice area
150 Tube holder
152 Upper right and left corners of storage tray
154 Angled input port
156 Upper edge wall of storage tray
158 Curved transition
160 Left edge wall of storage tray
162 Grow-out zone/area
164 Grow-out zone/area of passageway
166 Right/left wall of passageway
168 Upper wall of passageway
170 Output of splice tray
172 Mounting portion of tube holder
174 Divider portion of tube holder
176 Channel
178 Dovetail structure
180 Latch structure
182 Track
184 Tab
186 T-shaped keyhole
188 Parallel walls
190 Slot
192 Edge
194 Ribs of latching structure
196 Ribs of edge
198 Tube stop
200 Module
202 Housing
204 Tube
206 Connectorized pigtail
208 First major surface
210 Second major surface
212 Circumferential edge
214 Input opening
216 Catch
218 Window
220 Connector storage slot
222 First end of slot
224 Second end of slot
226 Retention tab
228 Side wall
229 Flat bottom surface
230 End wall
232 Rail

The invention claimed is:

1. A fiber optic module comprising:
a housing having a first major surface and an opposite second major surface, and a circumferential edge connecting the first major surface to the second major surface and defining an interior between the first and second major surfaces;
an input configured to receive at least one module input fiber;
at least one connectorized pigtail output routed from the housing, the pigtail output being configured to carry a signal from the at least one module input fiber entering the housing via the input; and
at least one connector storage feature disposed on the first major surface of the housing, the connector storage feature being configured to receive and store the connectorized pigtail output on the first major surface.

2. The module of claim 1, wherein the at least one connector storage feature is an open slot having a first end and a second end, and wherein the slot is configured to receive the connectorized pigtail at the first end and store the connectorized pigtail within the slot.

3. The module of claim 2, wherein the slot further comprises a pair of retention tabs, a pair of side walls, and at least a partial end wall to aid in storing the connectorized pigtail within the slot.

4. The module of claim 1, wherein the module includes a plurality of slots configured to store a plurality of pigtail outputs.

5. The module of claim 1, wherein the module further comprises at least one window opening in the first major surface, the window opening exposing an interior of the module and a portion of the second major surface of the module.

6. The module of claim 1, wherein the module provides straight through cable routing, passing the at least one module input fiber straight through to the at least one output pigtail.

7. The module of claim 1, wherein the module includes a fiber optic splitter for power-splitting the at least one module input fiber into a plurality of splitter output pigtails.

8. An enclosure comprising:
a base defining a splice region;
a cover coupled to the base to move between a closed position and an open position, the cover and the base cooperating to define an interior when the cover is in the closed position, the cover providing access to the interior when in the open position;

a plurality of ruggedized adapters disposed on the cover, each ruggedized adapter having an inner port accessible from an inner side of the cover and an outer port accessible from an outer side of the cover;

a module disposed at the inner side of the cover, at least one module input fiber being routed from the splice region of the base to the module, wherein the at least one module input fiber is output from the module as a pigtail having a connectorized end configured to be connected to the inner port of one of the ruggedized adapters, the module having a housing defining a first major surface having connector storage, an opposite second major surface, and a circumferential edge connecting the first major surface and the second major surface and defining an interior between the first and second major surfaces, the connector storage being configured to receive and hold the connectorized end of the pigtail on the first major surface; and a cable input location for receiving an input cable that includes at least one tube surrounding at least one feeder fiber that carries the same signal as the at least one module input fiber being routed from the splice region to the module, the input cable being anchored to the base at the cable input location.

9. The enclosure of claim 8, wherein the module includes at least one slot configured to store the connectorized end of the pigtail.

10. The enclosure of claim 9, wherein the slot includes a first end and a second end, and wherein the slot is configured to receive the connectorized pigtail at the first end and store the connectorized pigtail within the slot.

11. The enclosure of claim 10, wherein the slot further comprises a pair of retention tabs, a pair of side walls, and at least a partial end wall to aid in storing the connectorized pigtail within the slot.

12. The enclosure of claim 8, wherein the module includes a plurality of slots configured to store multiple connectorized ends of pigtails.

13. The enclosure of claim 8, wherein the cover defines a pocket at the inner side, and wherein the module is disposed in the pocket.

14. The enclosure of claim 8, wherein the module further comprises at least one window opening in the first major surface, the window opening exposing an interior of the module and a portion of a second major surface of the module, the second major surface being at the opposite side of the module from the first major surface.

15. The enclosure of claim 8, wherein the cover defines a pocket at the inner side, wherein the module is disposed in the pocket, and wherein the second major surface of the module includes a mounting arrangement that aids in securing the module within the pocket by the cover.

16. The enclosure of claim 8, wherein the module includes a fiber optic splitter for power-splitting the at least one module input fiber into a plurality of splitter output pigtails.

17. The enclosure of claim 8, wherein the module provides straight through cable routing, passing the at least one module input fiber straight through to at least one output pigtail.

18. The enclosure of claim 8, further comprising a second module carried by the cover, the second module extending parallel to the first module.

19. A fiber optic module comprising:

a housing having a first major surface and an opposite second major surface, and a circumferential edge connecting the first major surface to the second major surface and defining an interior between the first and second major surfaces;

an input configured to receive at least one module input fiber;

at least one connectorized pigtail output routed from the housing, the pigtail output being configured to carry a signal from the at least one module input fiber entering the housing via the input;

at least one connector storage feature disposed on the first major surface of the housing, the connector storage feature being configured to receive and store the connectorized pigtail output on the first major surface; and a pair of openings in the first major surface of the housing, the pair of openings exposing an interior of the module and a portion of the second major surface of the module including at least a portion of a mounting arrangement that aids in securing the module within a pocket defined by a cover of an enclosure.

20. The fiber optic module of claim 19, wherein the mounting arrangement includes catches that extend outwardly from the housing to mate with structures in the pocket of the enclosure.

* * * * *